(12) United States Patent
Sugiyama

(10) Patent No.: US 10,670,058 B2
(45) Date of Patent: Jun. 2, 2020

(54) CLIP

(71) Applicant: DAIWA KASEI KOGYO KABUSHIKI KAISHA, Okazaki-shi, Aichi-ken (JP)

(72) Inventor: Takahiro Sugiyama, Anjo (JP)

(73) Assignee: DAIWA KASEI KOGYO KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/058,983

(22) Filed: Aug. 8, 2018

(65) Prior Publication Data
US 2019/0048907 A1 Feb. 14, 2019

(30) Foreign Application Priority Data
Aug. 9, 2017 (JP) .................................. 2017-154369

(51) Int. Cl.
| F16B 2/22 | (2006.01) |
| F16B 21/07 | (2006.01) |
| F16B 5/06 | (2006.01) |
| B60R 13/02 | (2006.01) |

(52) U.S. Cl.
CPC ................ F16B 2/22 (2013.01); F16B 5/065 (2013.01); F16B 21/075 (2013.01); B60R 13/0206 (2013.01)

(58) Field of Classification Search
CPC ............................... B60R 13/0206; F16B 2/22
See application file for complete search history.

(56) References Cited

U.S. PATENT DOCUMENTS

| 6,449,814 B1 * | 9/2002 | Dinsmore | F16B 5/065 24/289 |
| D671,391 S * | 11/2012 | Komeno | D8/356 |
| D685,626 S * | 7/2013 | Komeno | D8/356 |
| D691,026 S * | 10/2013 | Komeno | D8/356 |
| D708,044 S * | 7/2014 | Komeno | D8/356 |
| D709,354 S * | 7/2014 | Komeno | D8/356 |
| 2011/0203081 A1 * | 8/2011 | Iwahara | F16B 5/065 24/458 |

(Continued)

FOREIGN PATENT DOCUMENTS

| EP | 2 749 778 A1 | 7/2014 |
| JP | 2013-044391 A | 3/2013 |

*Primary Examiner* — Robert Sandy
*Assistant Examiner* — David M Upchurch
(74) *Attorney, Agent, or Firm* — Christensen, Fonder, Dardi & Herbert PLLC

(57) ABSTRACT

A clip may have a clip main body that is configured to be coupled to a coupling rib of an attachment base formed in an attaching article and to be inserted into an attaching hole formed in an object member. The clip main body may include a head portion, a pair of engagement legs continuous with the head portion and elastically deformable inward and outward about the head portion, and a pair of retainer members continuous with the head portion and respectively configured to engage the coupling rib of the attachment base. The engagement legs respectively have first bent portions, second bent portions, and engagement portions positioned between the first and second bent portions and configured to engage an inner peripheral edge of the attaching hole. The engagement legs respectively have space-limiting portions that are respectively formed in inner surfaces thereof along the second bent portions thereof.

5 Claims, 22 Drawing Sheets

(56) References Cited

U.S. PATENT DOCUMENTS

| | | | |
|---|---|---|---|
| 2013/0199003 A1* | 8/2013 | Iwahara | F16B 2/22 24/530 |
| 2014/0000071 A1* | 1/2014 | Choi | F16B 21/075 24/543 |
| 2014/0363224 A1* | 12/2014 | Iwahara | B60R 13/0206 403/326 |
| 2015/0026933 A1 | 1/2015 | Komeno et al. | |

* cited by examiner

CLIP

PRIORITY CLAIM

The present application claims priority to Japanese Patent Application No. 2017-154369 filed on Aug. 9, 2017, which said application is incorporated by reference in its entirety herein.

BACKGROUND

The present disclosure relates to a clip. More specifically, the present disclosure relates to a clip for detachably attaching an attaching article or component (e.g., an automobile interior part such as a center cluster) to an object member (e.g. an instrument panel).

A known clip is taught by, for example, Japanese Laid-Open Patent Publication No. 2013-44391 (JP2013-44391A). As shown in FIG. 16, the known clip 401 (which may be referred to as a first known clip) is used to attach an interior part 402 (an attaching article) to an automobile instrument panel 403 (an object member). The known clip 401 includes a clip main body 410 made of rigid synthetic resin and having a leading end and a trailing end. The clip main body 410 is integrally formed as a unit and is configured to have a U-shape in cross section as a whole. As shown in FIG. 17, the clip main body 410 is composed of a rounded head portion 411 corresponding to the leading end thereof, a pair of engagement members or legs 412 continuous with the head portion 411 and elastically deformable or flexible inward and outward about the head portion 411, and a pair of retainer members 418 continuous with the head portion 411 while substantially separated from the engagement legs 412.

As shown in FIGS. 17 and 18, the engagement legs 412 are oppositely positioned in their flexing direction. The engagement legs 412 respectively outwardly obliquely extend from the leading end of the clip main body 410 toward the trailing end of the clip main body 410, so as to form most-flared portions therein in substantially longitudinally central portions thereof. Further, the engagement legs 412 are respectively inwardly bent at first bent portions positioned adjacent to the most-flared (bulged) portions, so as to form inclined shoulder portions 415 along the most-flared portions. The engagement legs 412 are then respectively outwardly bent at second bent portions, so as to form terminal portions continuous with the shoulder portions 415. The terminal portions respectively extend along a longitudinal axis of the clip 401 so as to form terminal ends of the engagement legs 412. Thus, each of the engagement legs 412 is formed as a cantilevered frame-shaped member having the two bent portions and having the shoulder portion 415 formed between the bent portions. Further, the engagement legs 412 are configured such that a distance d1 between the most-flared portions is greater than a width W of an attaching hole 430 formed in the instrument panel 403 (FIG. 16).

Conversely, the retainer members 418 are oppositely positioned. The retainer members 418 respectively have straight retainer portions that are positioned in substantially parallel with each other along a longitudinal axis of the clip 401. The retainer members 418 are configured such that a distance d2 between the retainer portions thereof is substantially identical to a thickness T of a rib 422 of an attachment base 421 attached to a rear surface of the interior part 402 (FIGS. 18 and 20). That is, the retainer members 418 are configured such that the rib 422 of the attachment base 421 can fit into a space formed between the retainer portions thereof. Further, the retainer members 418 respectively have engagement projections 419 that are respectively oppositely formed in the retainer portions thereof. The engagement projections 419 are respectively configured to engage an engagement slot 422a formed in the rib 422 of the attachment base 421 attached to the interior part 402 when the coupling rib 422 of the attachment base 421 is inserted into the space formed between the retainer members 418, so that the clip 401 may be immovably attached to the attachment base 421 of the interior part 402.

In order to attach the interior part 402 to the instrument panel 403, the main body 410 of the clip 401 is coupled to the rib 422 of the attachment base 421 attached to the interior part 402 by fitting the rib 422 into the space formed between the retainer portion of the retainer member 418. Thereafter, the clip main body 410 is pushed into the attaching hole 430 formed in the instrument panel 403. As a result, the engagement legs 412 are introduced into the attaching hole 430 while elastically flexing inwardly. When the most-flared portions of the engagement legs 412 pass through the attaching hole 430, the engagement legs 412 are restored or flexed outwardly, so that the shoulder portions 415 can elastically engage a periphery of the attaching hole 430 (FIG. 20). As a result, the engagement legs 412 are securely received in the attaching hole 430, so that the clip main body 410 can be connected to the instrument panel 403. Thus, the interior part 402 can be attached to the instrument panel 403 via the clip 401.

Further, the clip 401 may be held in the attaching hole 430 of the instrument panel 403 due to elastic engagement of the shoulder portion 415 of the engagement legs 412 and the periphery of the attaching hole 430. Therefore, the clip 401 may have a longitudinal retention force (an engagement force to the attaching hole 430) that is required for retaining the interior part 402 on the instrument panel 403.

To the contrary, in order to remove the interior part 402 from the instrument panel 403, the clip 401 is simply pulled against the retention force of the engagement legs 412. That is, an extraction force greater than the retention force is applied to the clip main body 410 connected to the instrument panel 403. As a result, the engagement legs 412 are gradually withdrawn from the attaching hole 430 while elastically flexing inwardly. When the shoulder portions 415 of the engagement legs 412 are disengaged from the periphery of the attaching hole 430, the most-flared portions of the engagement legs 412 pass through the attaching hole 430, so that the clip main body 410 can be pulled out from the attaching hole 430. Thus, the interior part 402 can be detached from the instrument panel 403.

Further, as shown in FIG. 22, another clip 501 (which may be referred to as a second known clip) is known. The clip 501 may function in the substantially same manner as the clip 401. The clip 501 includes a clip main body 510 that is composed of a head portion 411, a pair of engagement legs 512 continuous with the head portion 511, and a pair of retainer members 518 continuous with the head portion 511. However, unlike the retainer members 418 of the clip 401, the retainer members 518 are respectively integrally formed in inner surfaces of the engagement legs 512. That is, the retainer members 518 are not separated from the engagement legs 512.

In comparison with the clip 501, the clip 401 is relatively simplified in structure in the flexing direction of the engagement legs 412.

Further, the clip 401 is sufficiently prevented from being pulled out of the attaching hole 430 even if the extraction force is unexpectedly applied to the clip main body 410 in a normal direction (i.e., a direction corresponding to a longitudinal axis of the attaching hole 430) provided that the extraction force is smaller than the retention force. That is, the clip 401 has a sufficient (normal) retention force against the smaller extraction force applied thereto in the normal direction. However, as shown in FIG. 20, in a condition in which the clip 401 coupled to the attachment base 421 of the interior part 402 is inserted into the attaching hole 430 of the instrument panel 403, substantial spaces 450 may be formed between inner surfaces 412a of the engagement legs 412 and the rib 422 of the attachment base 421 attached to the interior part 402 along the second bent portions of the engagement legs 412. Therefore, if the extraction force is unexpectedly applied to the clip main body 410 in an oblique direction (i.e., a direction inclined with respect to the longitudinal axis of the attaching hole 430), the clip main body 410 may be inclined with respect to the axis of the attaching hole 430 due to the spaces 450, so that the engagement legs 412 of the clip main body 410 may be unevenly flexed inward even if the extraction force is relatively small. As a result, the shoulder portions 415 of the engagement legs 412 may be easily disengaged from the periphery of the attaching hole 430. This means that the clip main body 410 can be easily withdrawn from the attaching hole 430, so that the interior part 402 can be removed from the instrument panel 403 with the clip 401. That is, the clip 401 (the engagement legs 412) does not have a sufficient (oblique) retention force against the extraction force that is obliquely applied to the clip main body 410.

Thus, there is a need in the art for improved clips.

SUMMARY

For example, in one aspect of the present disclosure, a clip may have a clip main body that is configured to be coupled to a coupling rib of an attachment base formed in an attaching article and to be inserted into an attaching hole formed in an object member. The clip main body may include a head portion, a pair of engagement legs continuous with the head portion and elastically deformable inward and outward about the head portion, and a pair of retainer members continuous with the head portion and respectively configured to engage the coupling rib of the attachment base. The engagement legs respectively have first bent portions, second bent portions, and engagement portions positioned between the first and second bent portions and configured to engage an inner peripheral edge of the attaching hole. The engagement legs respectively have space-limiting portions that are respectively formed in inner surfaces thereof along the second bent portions thereof.

According to the aspect of the present disclosure, when an extraction force is obliquely applied to the clip main body in a condition in which the clip main body coupled to the coupling rib of the attachment base is inserted into the attaching hole of the object member, spaces formed between the inner surfaces of the engagement legs and the coupling rib of the attachment base may be closed due to the space-limiting portions. Therefore, the clip main body may substantially be prevented from being inclined, so that the engagement legs of the clip main body may be prevented from being unevenly flexed inward. As a result, the clip may be sufficiently prevented from being pulled out of the attaching hole even when the clip main body is pulled obliquely. That is, the clip may have a sufficient (oblique) retention force against the extraction force that is obliquely applied to the clip main body.

Optionally, the space-limiting portions are configured to be positioned within the attaching hole in the condition in which the clip main body coupled to the coupling rib of the attachment base is inserted into the attaching hole.

Further, the space-limiting portions are configured to minimize spaces formed between the inner surfaces of the engagement legs and the coupling rib of the attachment base in a condition in which the clip main body coupled to the coupling rib of the attachment base is inserted into the attaching hole.

Other objects, features and advantages of the present disclosure will be readily understood after reading the following detailed description together with the accompanying drawings and the claims.

DETAILED DESCRIPTION

Detailed representative embodiments of the present disclosure are shown in FIGS. 1 to 15.

A first detailed representative embodiment of the present disclosure will be described with reference to FIGS. 1 to 6.

Figure 1:
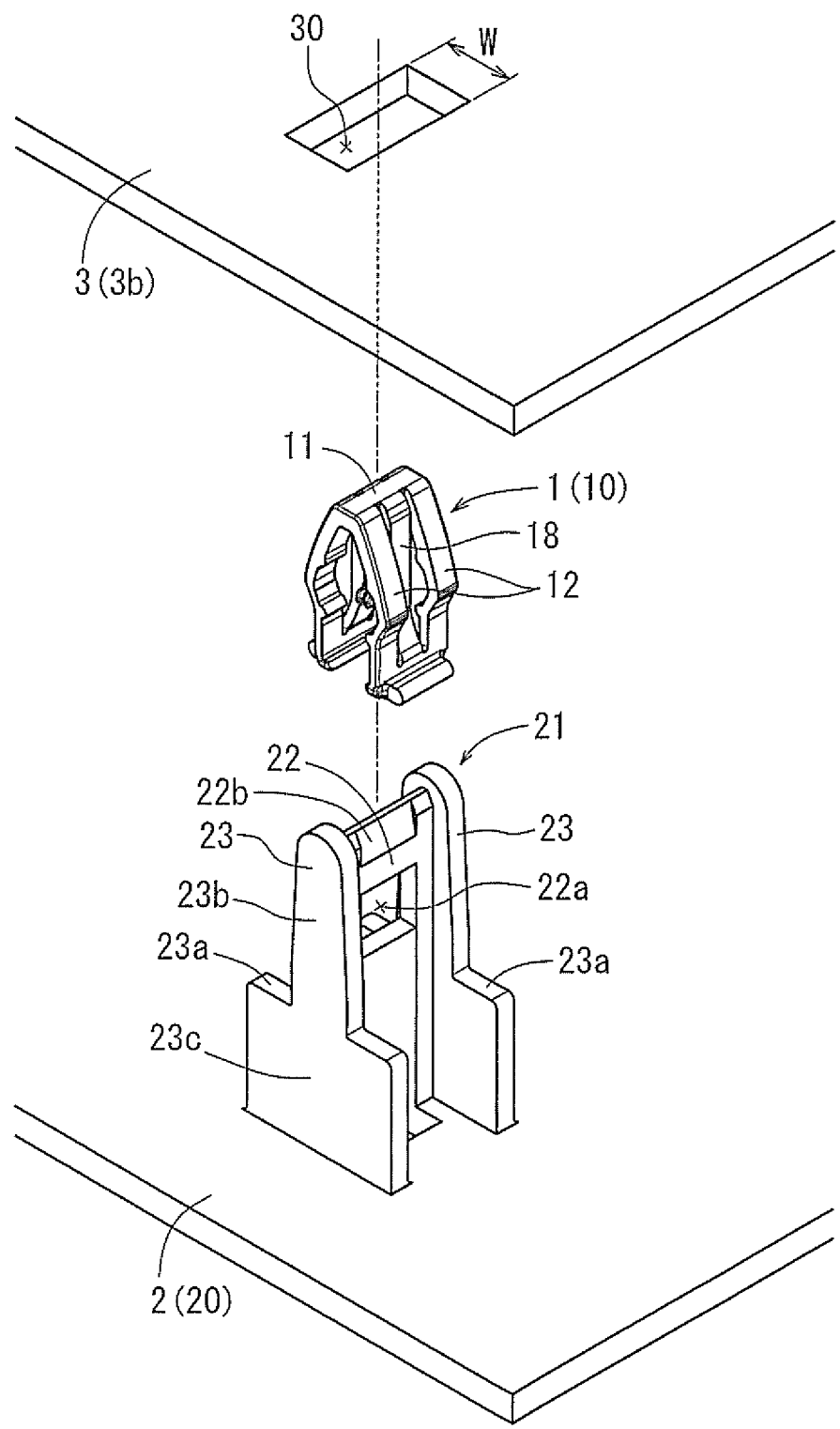
FIG. 1 is a perspective view of a clip according to a first embodiment, an interior part and an instrument panel, which illustrates a condition before the interior part is attached to the instrument panel using the clip.
Figure 5:
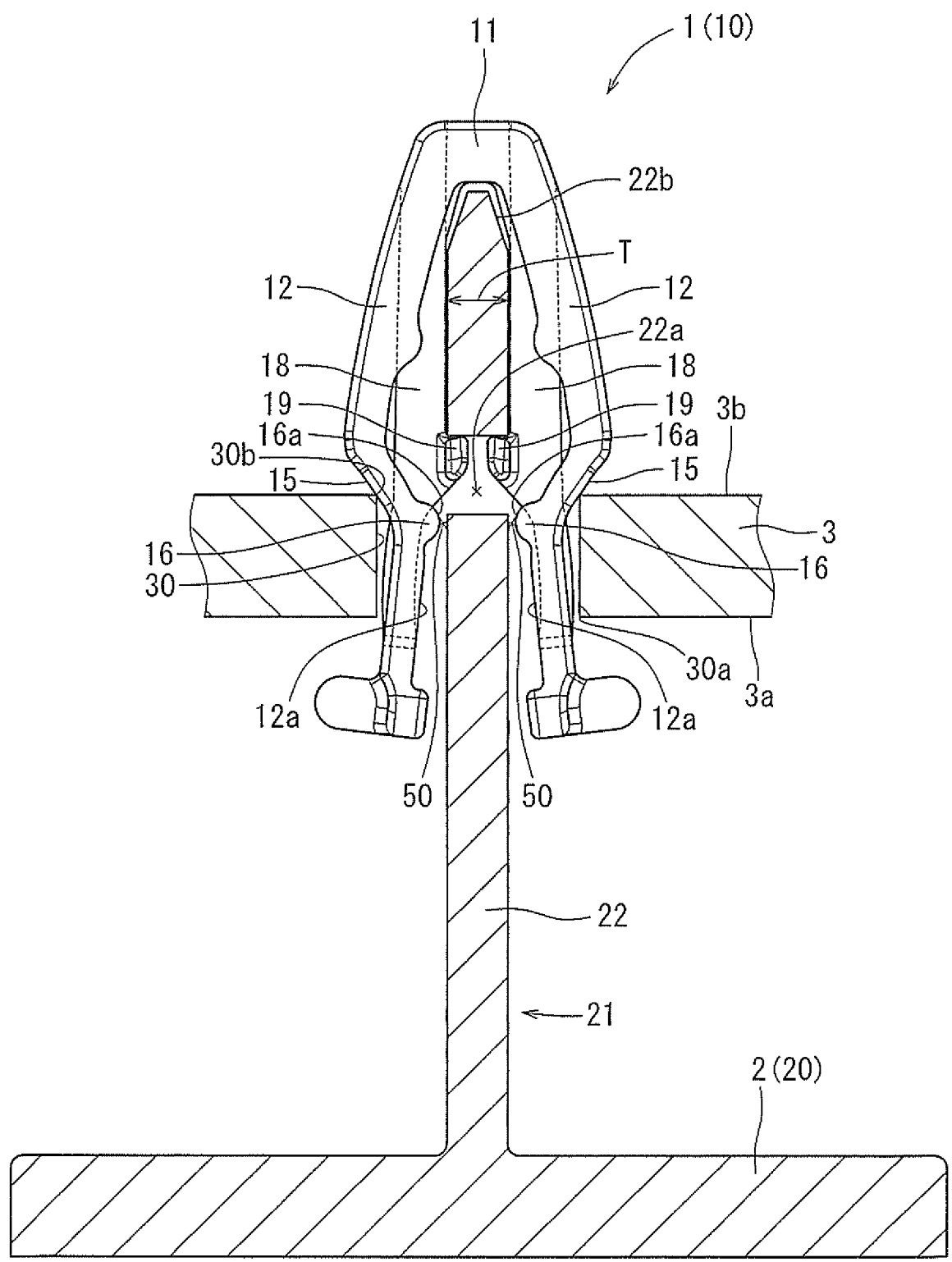
FIG. 5 is an explanatory elevational view of the clip, which illustrate a condition in which the interior part is attached to the instrument panel using the clip.
Figure 6:
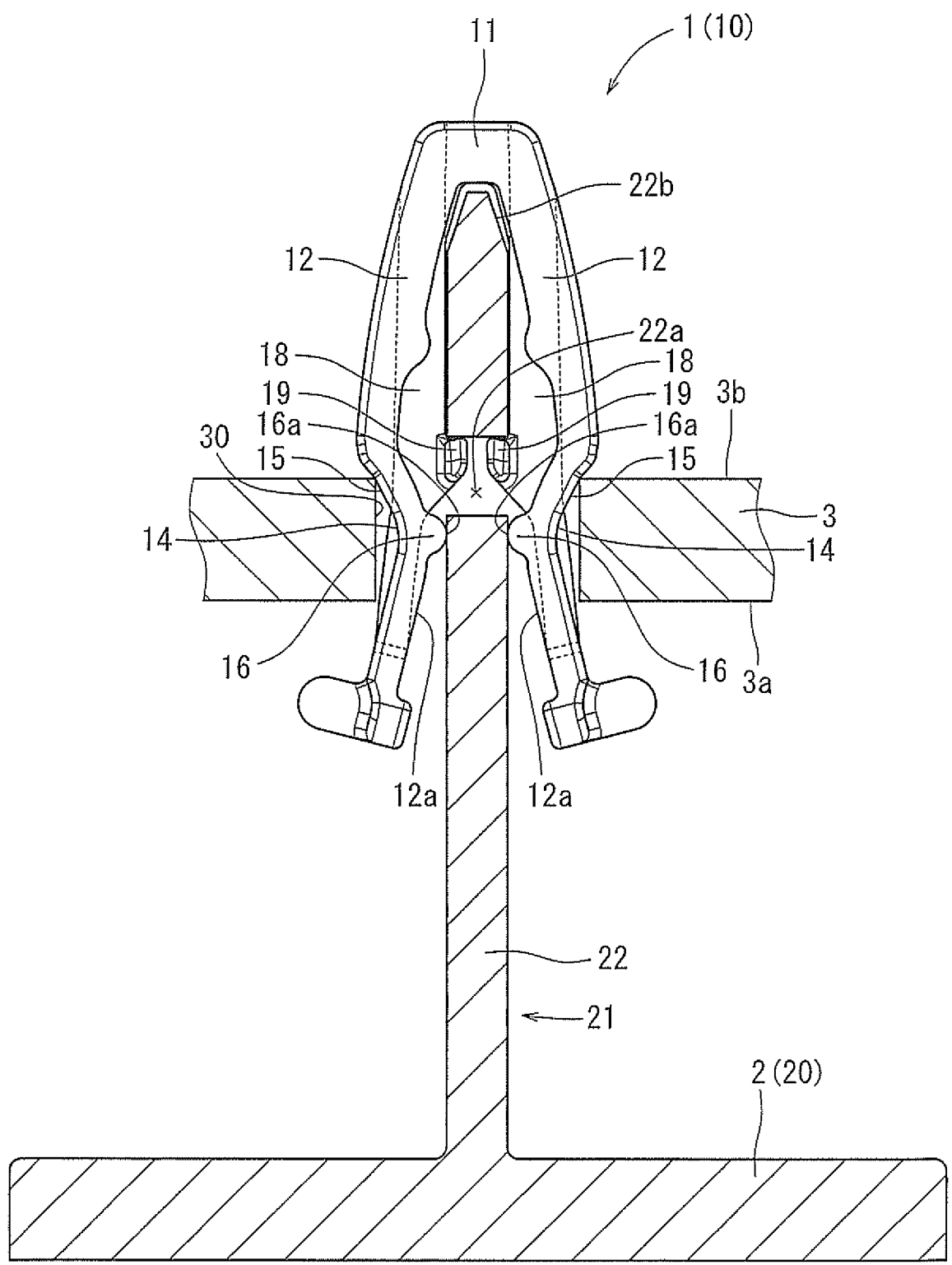
FIG. 6 is an explanatory elevational view of the clip, which illustrate a condition in which an extraction force is applied to the clip shown in FIG. 5.

As shown in FIG. 1, the first embodiment may be directed to a clip 1 that is used to detachably attach an interior part 2 (an attaching article) to an instrument panel 3 (an object member). In particular, the clip 1 may be configured to be coupled to a coupling rib 22 of an attachment base 21 formed in an interior part main body 20 of the interior part 2, so as to be attached to the attaching base 21 of the interior part 2. Further, the clip 1 may be configured to be inserted into an attaching hole 30 formed in the instrument panel 3. Upon insertion of the clip 1 into the attaching hole 30 after the clip 1 is coupled to the attachment base 21 of the interior part 2, the interior part 2 may be attached to the instrument panel 3 via the clip 1 (FIG. 5). As will be recognized, a plurality of clips, a plurality of coupling ribs and a plurality of attaching holes may be generally used in order to attach the interior part 2 to the instrument panel 3. However, one of them (i.e., the clip 1, the attachment base 21 and the attaching hole 30) may be described in this description because they have the same structure as each other.

Figure 2:
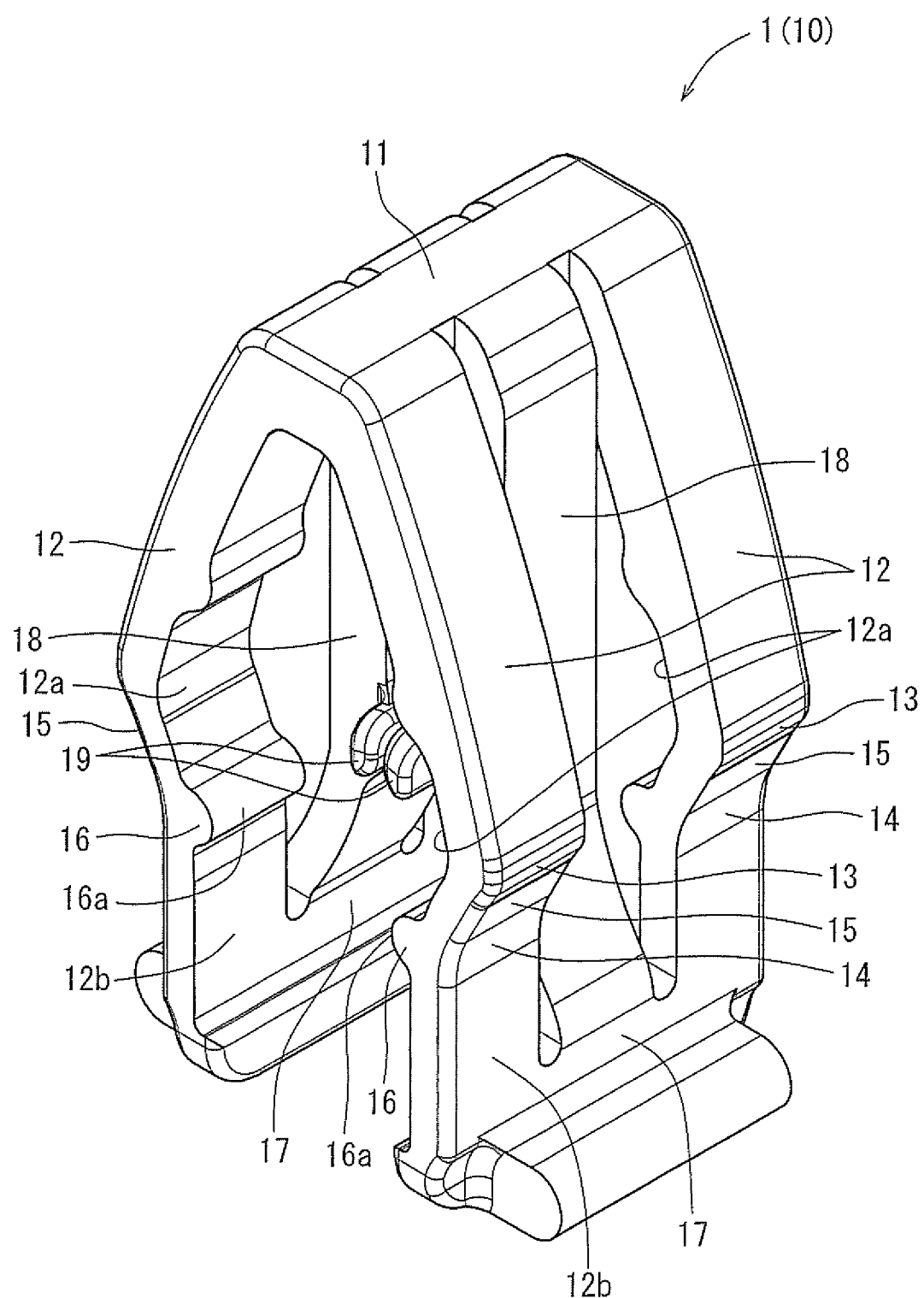
FIG. 2 is an enlarged perspective view of the clip.

The clip 1 may include a clip main body 10 made of rigid synthetic resin, e.g., polypropylene (PP), and configured to have a wedged leading end and an open trailing end. The clip main body 10 may be integrally formed as a unit. Further, the clip main body 10 may be shaped to have a U-shape in cross section as a whole. As shown in FIG. 2, the clip main body 10 may be composed of a rounded head (guide) portion 11 corresponding to the leading end thereof, a pair of engagement members or legs 12 continuous with the head portion 11 and elastically deformable or flexible inward and outward about the head portion 11, and a pair of retainer members 18 continuous with the head portion 11 while substantially separated from the engagement legs 12.

Figure 3:
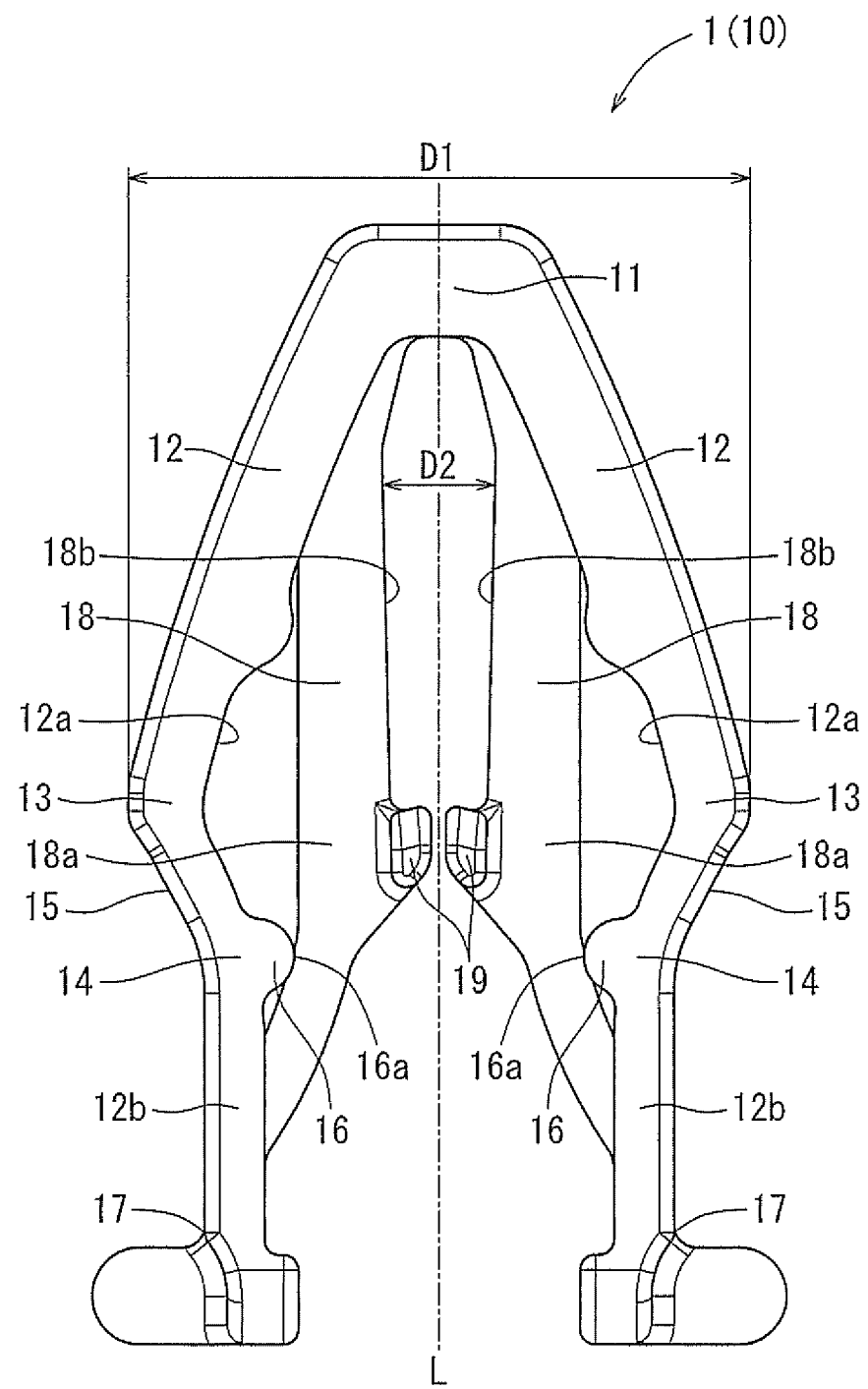
FIG. 3 is an elevational view of the clip.
Figure 4:
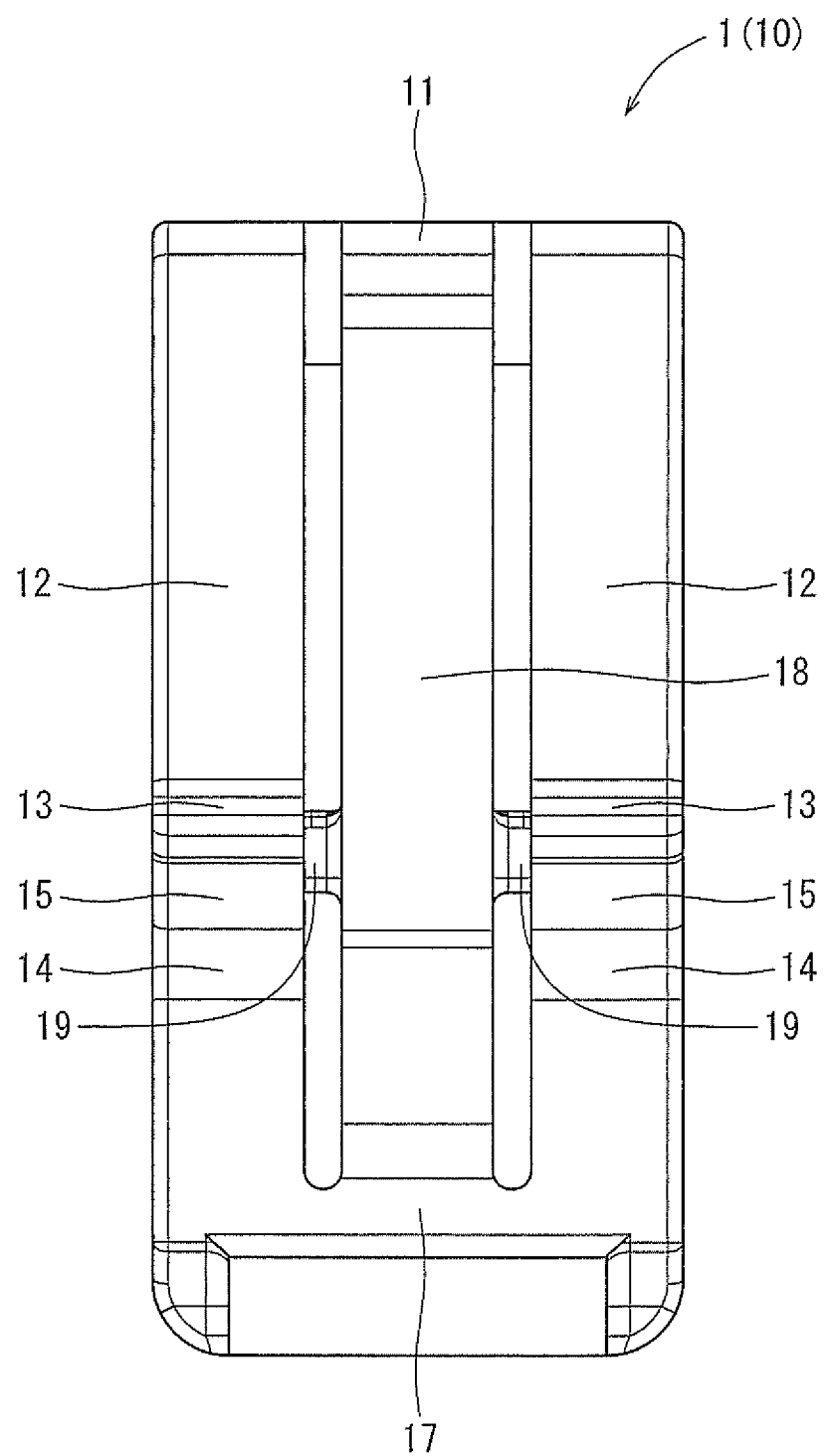
FIG. 4 is a side view of the clip.

As shown in FIGS. 2 and 3, the engagement legs 12 may be oppositely positioned in their flexing direction. The engagement legs 12 may respectively outwardly obliquely extend from the leading end of the clip main body 10 toward the trailing end of the clip main body 10, so as to form inclined main portions respectively having most-flared portions therein. The most-flared portions may preferably be positioned in substantially longitudinally central portions of the engagement legs 12. Further, the engagement legs 12 may respectively be inwardly bent at first bent portions 13 positioned adjacent to the most-flared portions, so as to form inclined shoulder (engagement) portions 15 along the most-flared portions. The engagement legs 12 may then respectively be outwardly bent at second bent portions 14, so as to form terminal portions 12b continuous with the shoulder portions 15. The terminal portions 12b may respectively extend along a longitudinal axis L of the clip 1 so as to form terminal ends 17 of the engagement legs 12. Thus, each of the engagement legs 12 may be formed as a cantilevered frame-shaped member having the two bent portions 13 and 14 and having the shoulder portion 15 formed between the bent portions 13 and 14 (FIGS. 2 and 4). Further, the engagement legs 12 may be configured such that a distance D1 between the most-flared portions is greater than a width W of an attaching hole 30 formed in the instrument panel 3 (FIGS. 1 and 3).

As shown in FIGS. 2 and 3, the engagement legs 12 may respectively have space-limiting portions or projections 16 that are respectively formed in inner surfaces 12a thereof. The projections 16 may respectively be oppositely projected inward in the flexing direction of the engagement legs 12. As shown in FIG. 2, the projections 16 may preferably be laterally elongated along the second bent portions 14 of the engagement legs 12. As shown in FIG. 3, each of the projections 16 may preferably have a semicircular shape, so as to have a rounded top surface 16a in cross section.

Conversely, as shown in FIGS. 2 and 3, the retainer members 18 may be oppositely positioned in the flexing direction of the engagement legs 12. The retainer members 18 may respectively extend from the leading end of the clip main body 10 toward the trailing end of the clip main body 10, so as to form substantially straight retainer portions that extend in substantially parallel with each other along the longitudinal axis L of the clip 1. The retainer members 18 may respectively be outwardly bent at bent portions 18a, so as to form curved portions that are respectively flexibly connected to the terminal ends 17 of the engagement legs 12. Further, the retainer members 18 may be configured such that a distance D2 between inner surfaces 18b of the retainer portions thereof is substantially identical to a thickness T of the coupling rib 22 of the attachment base 21 formed in a rear surface of the interior part 2 (FIGS. 3 and 5). That is, the retainer members 18 may be configured such that the coupling rib 22 of the attachment base 21 can fit into a space formed between the retainer portions thereof.

As shown in FIGS. 2 and 3, the retainer members 18 may respectively have engagement projections 19 that are respectively formed in the inner surfaces 18b thereof. The engagement projections 19 may respectively be oppositely projected inward. As shown in FIGS. 2 and 4, the engagement projections 19 may preferably be laterally elongated along the bent portions 18a of the retainer members 18. As shown in FIG. 4, the engagement projections 19 may respectively be laterally projected beyond the retainer members 18. Further, the engagement projections 19 may respectively be configured to engage a rectangular engagement slot 22a formed in the coupling rib 22 of the attachment base 21 formed in the interior part 2 when the coupling rib 22 of the attachment base 21 is inserted into the space formed between the retainer members 18, so that the clip 1 may be substantially immovably connected to the attachment base 21 of the interior part 2.

The interior part 2 may be made of rigid synthetic resin, e.g., PP. As shown in FIG. 1, the interior part 2 (the interior part main body 20 and the attachment base 21) may be integrally formed as a unit. In particular, the attachment base 21 may preferably be integrally formed in a rear surface of the interior part main body 20 (i.e., a surface opposite to an ornamental surface of the interior part main body 20). As previously described, the coupling rib 22 of the attachment base 21 may be configured to be introduced into the space formed between the retainer portions of the retainer members 18. The rectangular engagement slot 22a of the coupling rib 22 may be formed as a through bore passing through the coupling rib 22. Further, the attachment base 21 may have a pair of guide ribs 23 that are respectively positioned on laterally opposite ends of the coupling rib 22. The guide ribs 23 may function to guide the clip 1 when the clip main body 10 is attached to the coupling rib 22. Further, the guide ribs 23 may respectively be composed of guide portions 23b and widened stopper portions 23c. Each of the guide portions 23b may preferably have a width substantially equal to the width W of the attaching hole 30 formed in the instrument panel 3, so as to be closely introduced into the attaching hole 30. Conversely, each of the widened stopper portions 23c may have a width greater than the width W of the attaching hole 30, so as to have a pair of shoulder portions 23a positioned on both sides of the guide portions 23b. Further, the coupling rib 22 may have a tapered end surface 22b so as to be smoothly inserted into the space formed between the retainer portions of the retainer members 18 when the clip main body 10 is attached to the coupling rib 22.

The instrument panel 3 may be a known instrument panel. Further, the attaching hole 30 of the instrument panel 3 may be formed as an elongated rectangular through bore passing through the instrument panel 3. Further, as previously described, the attaching hole 30 may be configured such that the width W thereof is smaller than the distance D1 between the most-flared portions of the engagement legs 12.

Next, a method of attaching the interior part 2 to the instrument panel 3 using the clip 1 and detaching the interior part 2 from the instrument panel 3 will now be described in detail.

First, the clip main body 10 is pressed to the coupling rib 22 of the attachment base 21 formed in the interior part 2 at the trailing end thereof. As a result, the coupling rib 22 of the attachment base 21 can be introduced into the space formed between the retainer portions of the retainer members 18. At the same time, the engagement projections 19 formed in the inner surfaces 18*b* of the retainer members 18 may engage the engagement slot 22*a* formed in the coupling rib 22 of the attachment base 21. Thus, the clip 1 can be connected to the attachment base 21 of the interior part 2.

Thereafter, the clip 1 coupled to the attachment base 21 of the interior part 2 may be pushed into the attaching hole 30 formed in the instrument panel 3 at the leading end of the clip main body 10. As a result, the engagement legs 12 of the clip 1 may be progressively introduced into the attaching hole 30 while they are elastically flexed inward about the head portion 11 by interference of the inclined main portions of the engagement legs 12 with an outer peripheral edge 30*a* of the attaching hole 30. Subsequently, when the most-flared portions of the engagement legs 12 pass through the attaching hole 30, the engagement legs 12 can be restored or flexed outwardly, so that the inclined shoulder portions 15 continuous with the most-flared portions can elastically engage an inner peripheral edge 30*b* of the attaching hole 30 while facing an inner surface 3*b* of the instrument panel 3. At this time, the shoulder portions 23*a* formed in the guide ribs 23 of the attachment base 21 may contact an outer surface 3*a* of the instrument panel 3, so that the clip 1 may be prevented from being excessively introduced into the attaching hole 30. As a result, the clip 1 may be held in a predetermined position in the attaching hole 30, so as to be connected to the instrument panel 3. Thus, the interior part 2 may be attached to the instrument panel 3 via the clip 1 (FIG. 5).

Further, as shown in FIG. 5, in a condition in which the clip 1 coupled to the attachment base 21 of the interior part 2 is inserted into the attaching hole 30 of the instrument panel 3, spaces 50 may be formed between inner surfaces 12*a* of the engagement legs 12 and the coupling rib 22 of the attachment base 21 formed in the interior part main body 20 along the second bent portions of the engagement legs 12. However, the spaces 50 may be limited or minimized due to the projections 16 formed in the engagement legs 12.

The clip 1 may be held in the attaching hole 30 due to elastic engagement of the shoulder portion 15 of the engagement legs 12 and the inner peripheral edge 30*b* of the attaching hole 30. Therefore, the clip 1 may have a retention force (an engagement force to the attaching hole 30) that is required for retaining the interior part 2 on the instrument panel 3.

To the contrary, in order to remove the interior part 2 from the instrument panel 3, the clip 1 may be simply pulled against the retention force of the clip 1. That is, an extraction force greater than the retention force may be applied to the clip 1 connected to the instrument panel 3. As a result, the engagement legs 12 may be gradually withdrawn from the attaching hole 30 while elastically flexing inwardly. When the shoulder portions 15 of the engagement legs 12 are disengaged from the inner peripheral edge 30*b* of the attaching hole 30, the most-flared portions of the engagement legs 12 may pass through the attaching hole 30, so that the clip 1 may be pulled out from the attaching hole 30. Thus, the interior part 2 may be detached from the instrument panel 3.

Further, the clip 1 may be sufficiently prevented from being pulled out of the attaching hole 30 even if the extraction force is unexpectedly applied to the clip main body 10 in a normal direction (i.e., a direction corresponding to a longitudinal axis of the attaching hole 30 of the instrument panel 3) provided that the extraction force is smaller than the retention force. That is, the clip 1 may have a sufficient (normal) retention force against the extraction force applied thereto in the normal direction.

Conversely, if the extraction force is unexpectedly applied to the clip main body 10 in an oblique direction (i.e., a direction inclined with respect to the longitudinal axis of the attaching hole 30), the clip main body 10 may be pulled obliquely. However, at this time, the top surface 16*a* of the projections 16 formed in the engagement legs 12 may quickly contact the coupling rib 22 of the attachment base 21. That is, the spaces 50 may be quickly reduced or closed due to the projections 16 formed in the engagement legs 12. Therefore, the clip main body 10 may substantially be prevented from being inclined with respect to the axis of the attaching hole 30, so that the engagement legs 12 of the clip main body 10 may be prevented from being unevenly flexed inward. As a result, similar to the case in which the extraction force is applied to the clip main body 10 in the normal direction, the clip 1 may be sufficiently prevented from being pulled out of the attaching hole 30. That is, the clip 1 (the engagement legs 12) may have a sufficient (oblique) retention force against the extraction force that is obliquely applied to the clip main body 10.

As previously described, the projections 16 may be formed in the engagement legs 12 so as to be positioned along the second bent portions 14 of the engagement legs 12. Therefore, when the clip 1 is used (i.e., when the clip 1 coupled to the attachment base 21 of the interior part 2 is pushed into the attaching hole 30 of the instrument panel 3 until the inclined shoulder portions 15 can elastically engage the inner peripheral edge 30*b* of the attaching hole 30), the projections 16 may be positioned within the attaching hole 30. As a result, when the clip main body 10 may be pulled obliquely (i.e., when the extraction force is applied to the clip main body 10 in the oblique direction), the projections 16 may contact the coupling rib 22 of the attachment base 21 within the attaching hole 30. Therefore, the engagement legs 12 of the clip main body 10 may be effectively prevented from being unevenly flexed inward. Thus, the clip 1 may effectively resist the extraction force that is obliquely applied to the clip main body 10. That is, the clip 1 may have the increased (oblique) retention force.

Figure 7:
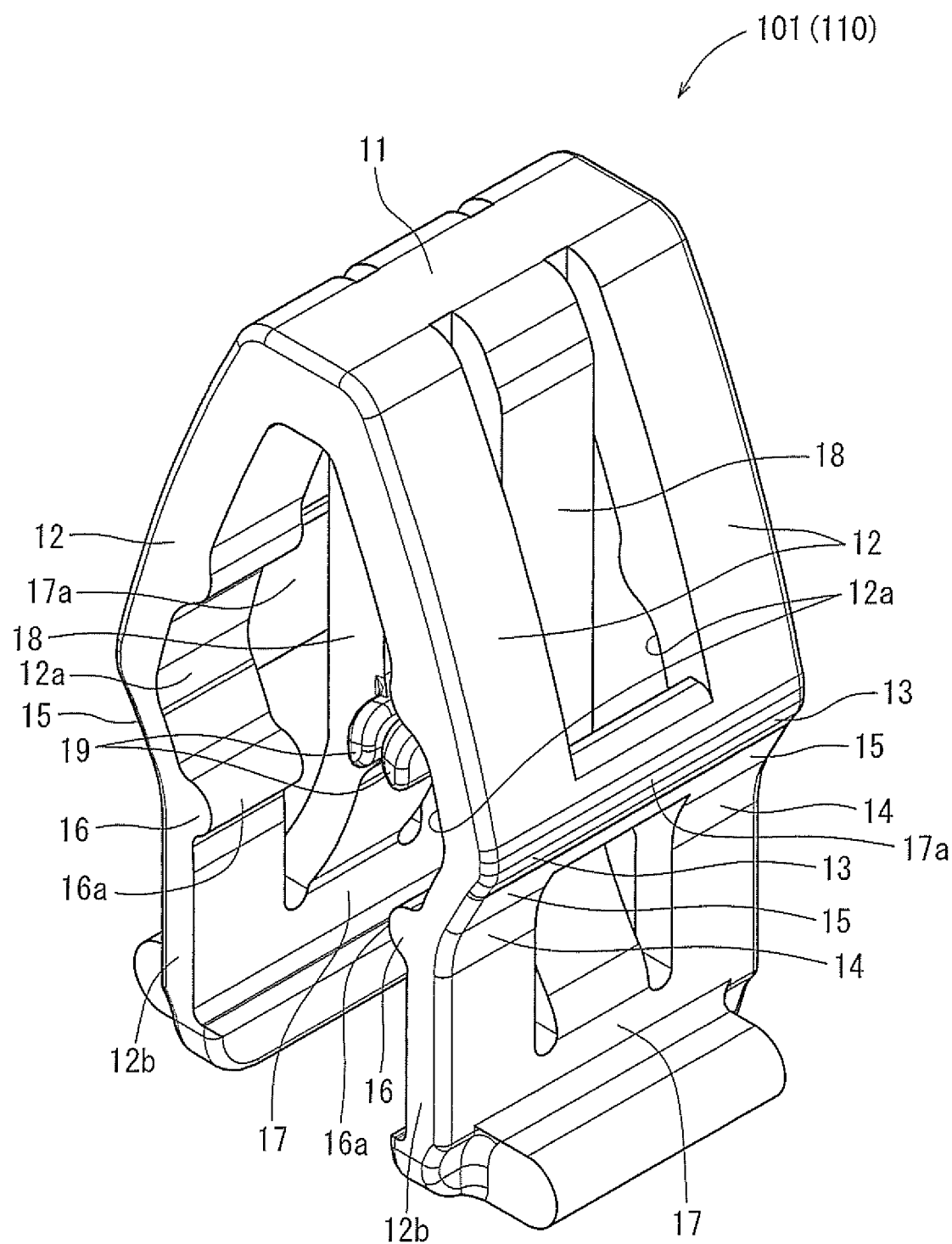
FIG. 7 is an enlarged perspective view of a clip according to a second embodiment.
Figure 8:
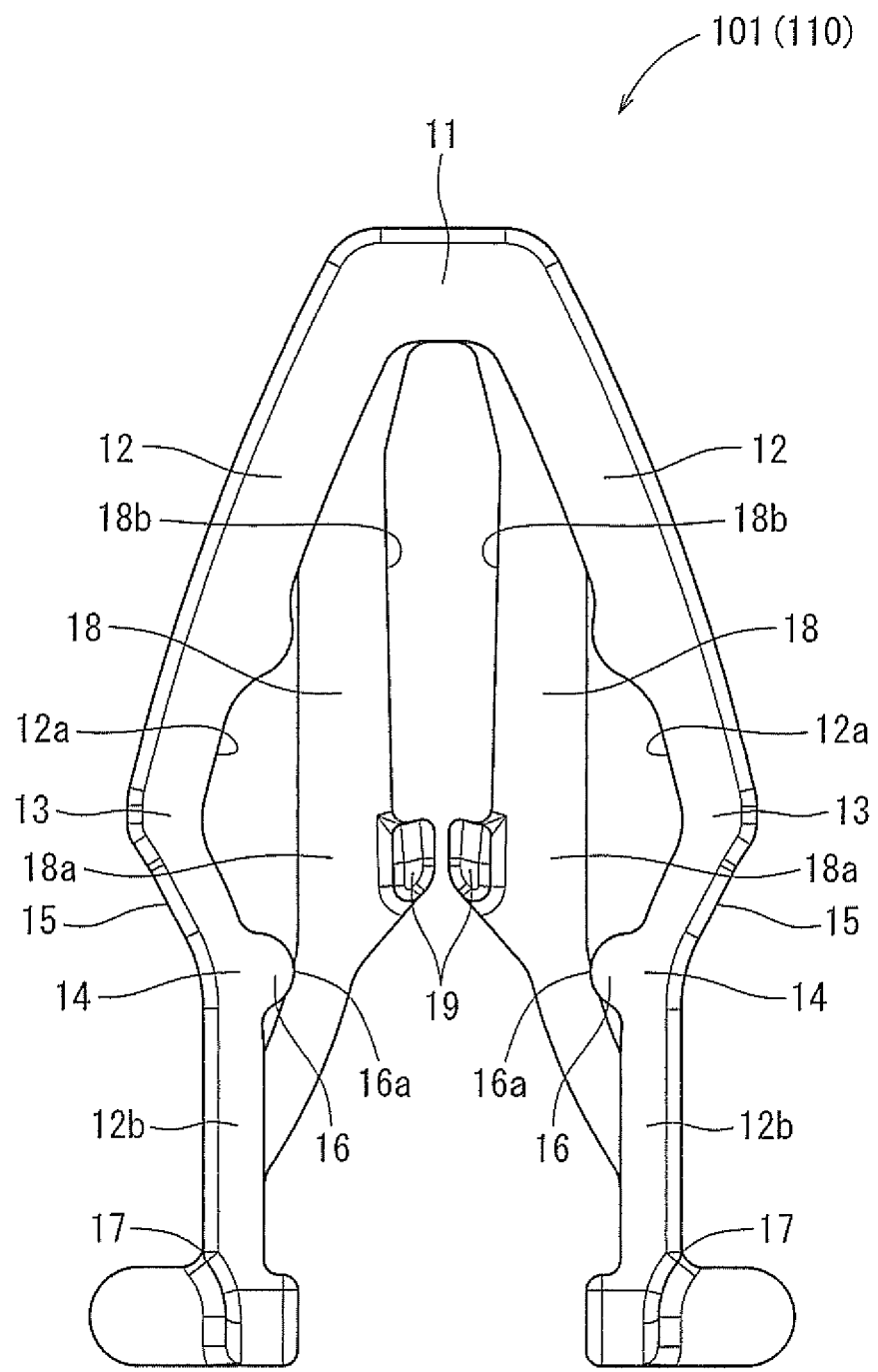
FIG. 8 is an elevational view of the clip.
Figure 9:
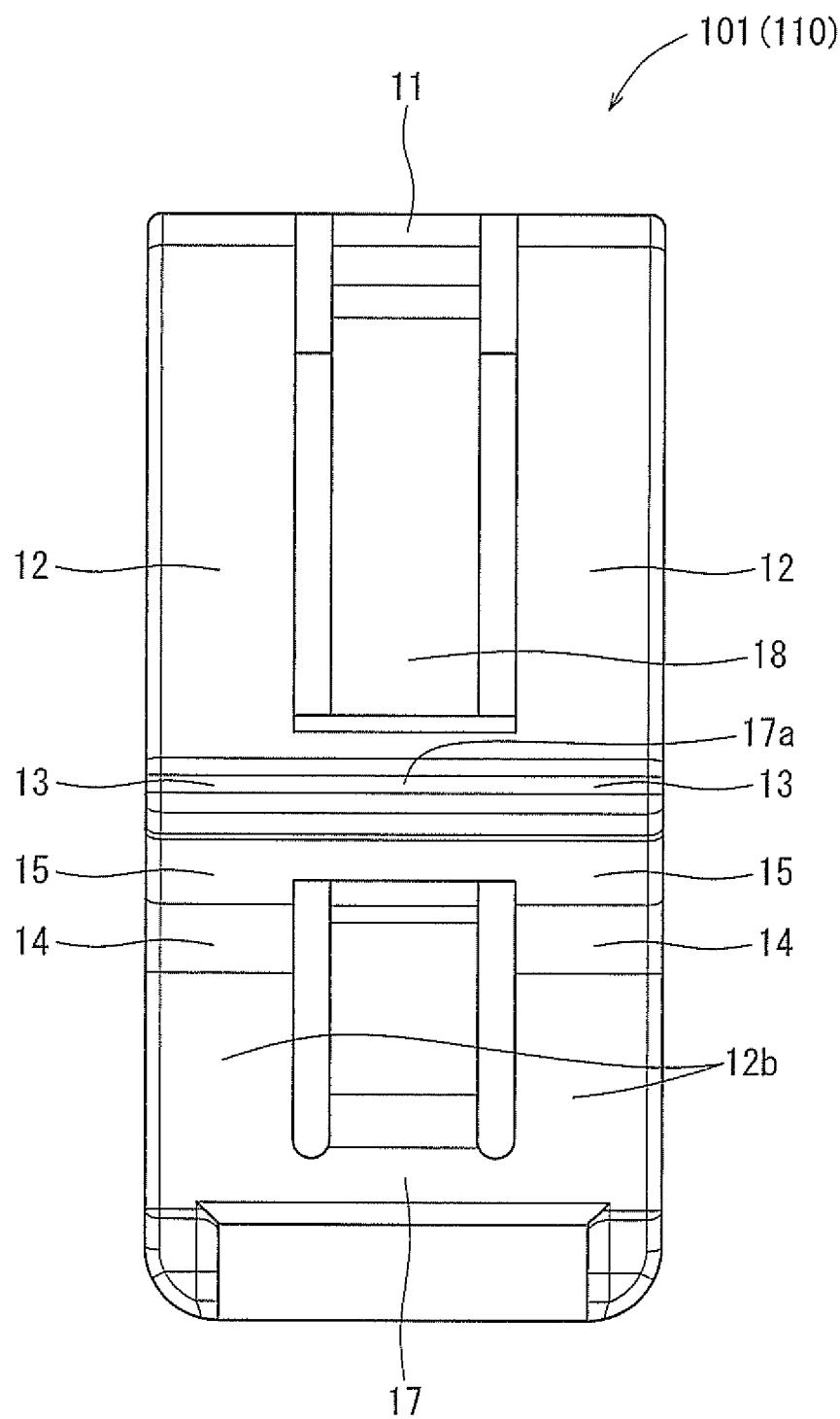
FIG. 9 is a side view of the clip.

A second detailed representative embodiment of the present disclosure will be described with reference to FIGS. 7 to 9. Because the second embodiment relates to the first embodiment, only the constructions and elements that are different from the first embodiment will be explained in detail.

In a clip main body 110 of a clip 101 in the second embodiment, the frame-shaped engagement legs 12 may respectively have reinforcement portions or bars 17*a*. As shown in FIGS. 7 and 9, the reinforcement bars 17*a* may respectively be configured to laterally bridge or connect the frame-shaped engagement legs 12 along the most-flared portions thereof, so as to laterally reinforce the engagement legs 12. Thus, in this embodiment, each of the engagement legs 12 may be formed as a laterally reinforced frame-shaped member.

The clip main body 110 thus constructed may be effectively prevented from being deformed laterally when the extraction force is applied thereto. As a result, the clip 101 may further effectively resist the extraction force that is applied to the clip main body 110. That is, the clip 10 may have a further increased retention force.

Naturally, various changes and modifications may be made to the present disclosure without departing from the scope of the disclosure. For example, in the embodiments, the interior part 2 and the instrument panel 3 are respectively exemplified as the attaching article and the object member. However, an exterior part and a vehicle body may respectively used as the attaching article and the object member.

Further, in the embodiments, each of the retainer members 18 is connected to the head portion 11 at one end thereof and is connected to the terminal end 17 of each of the engagement legs 12 at the other end thereof. However, one end of each of the retainer members 18 may be separated from the head portion 11 so as to function as a free end. Conversely, the other end of each of the retainer members 18 may be separated from the terminal end 17 of each of the engagement legs 12 so as to function as a free end.

Figure 10:
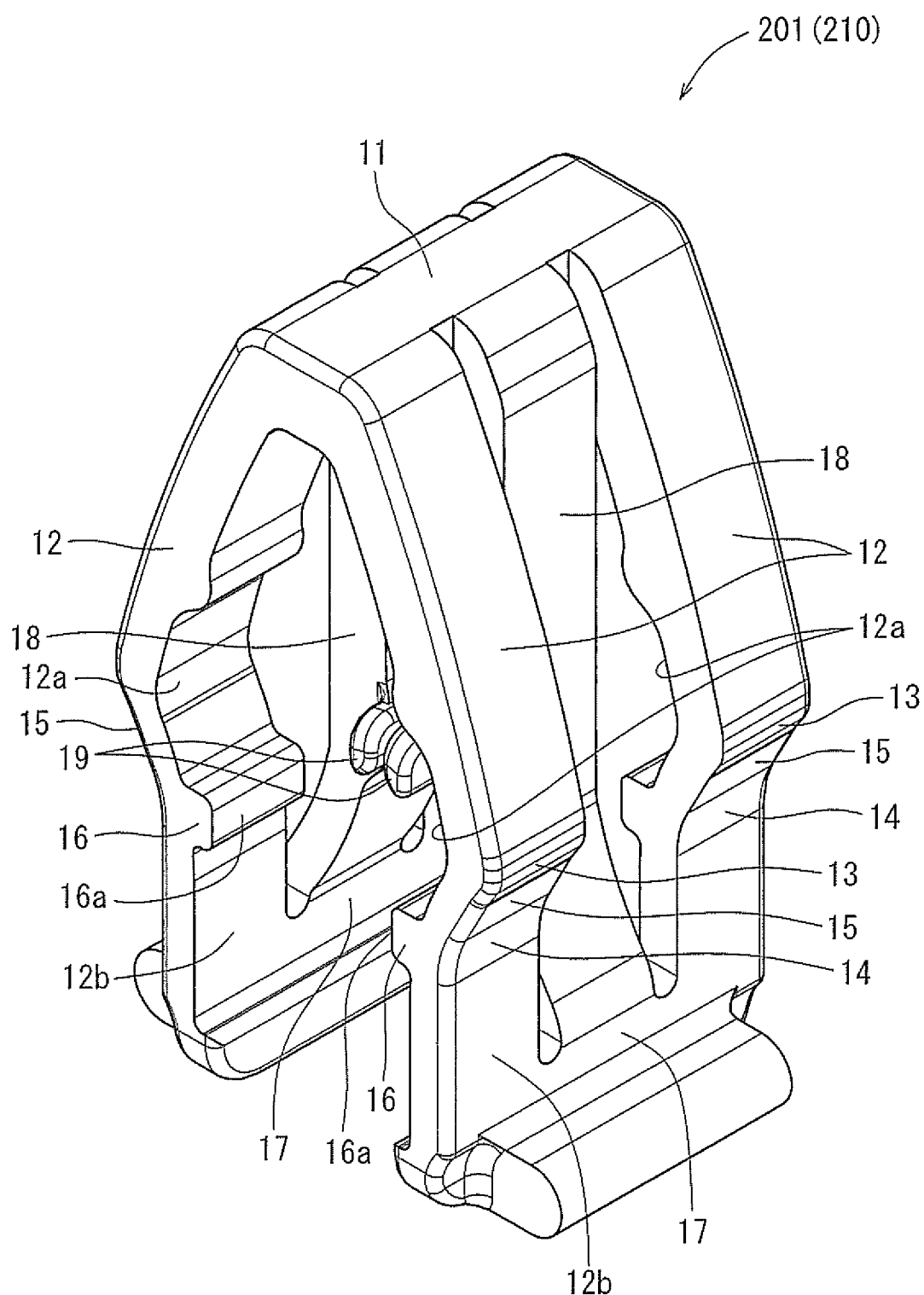
FIG. 10 is an enlarged perspective view of a clip according to a first modified form of the first embodiment.
Figure 11:
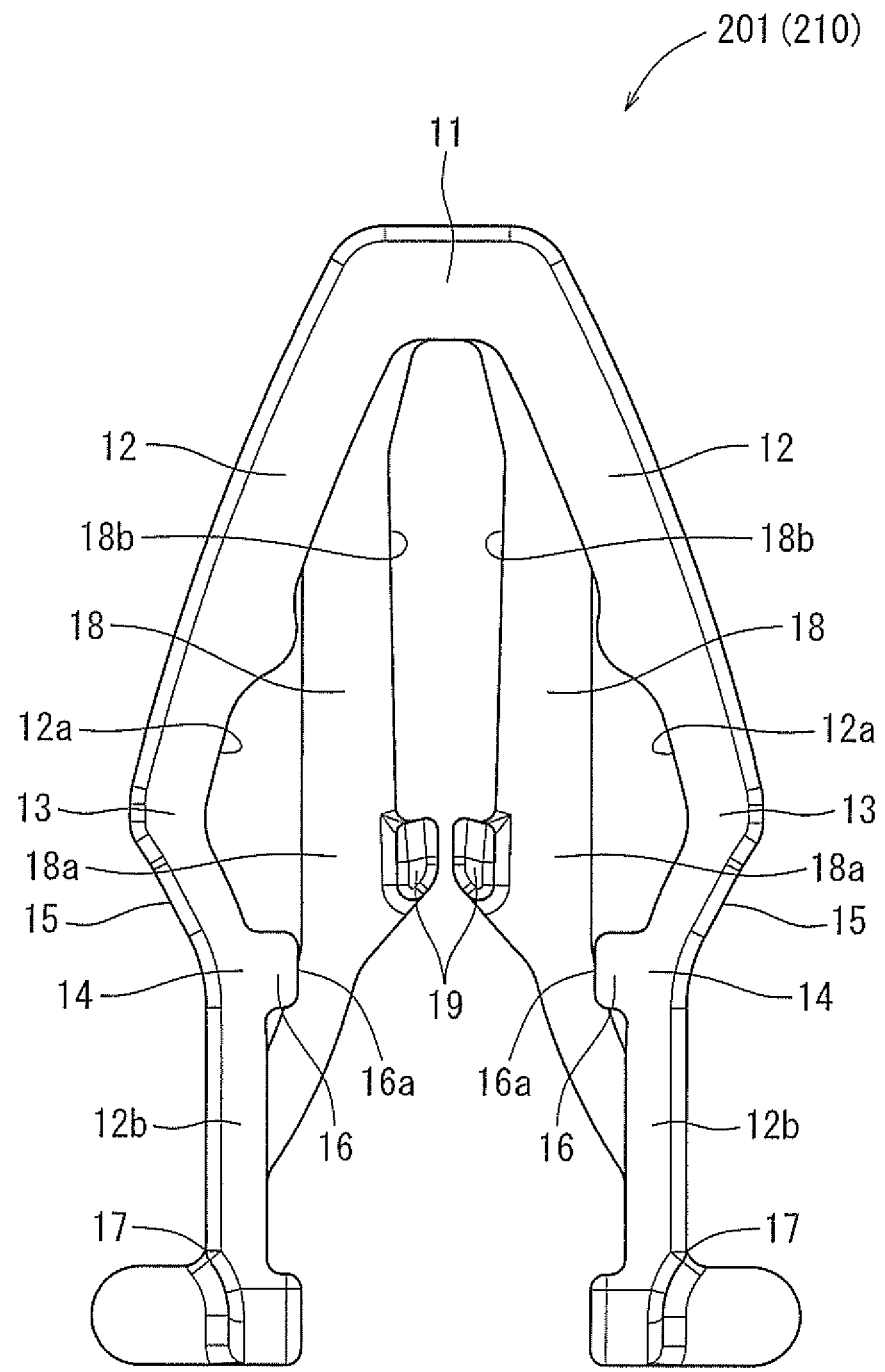
FIG. 11 is an elevational view of the clip.
Figure 12:
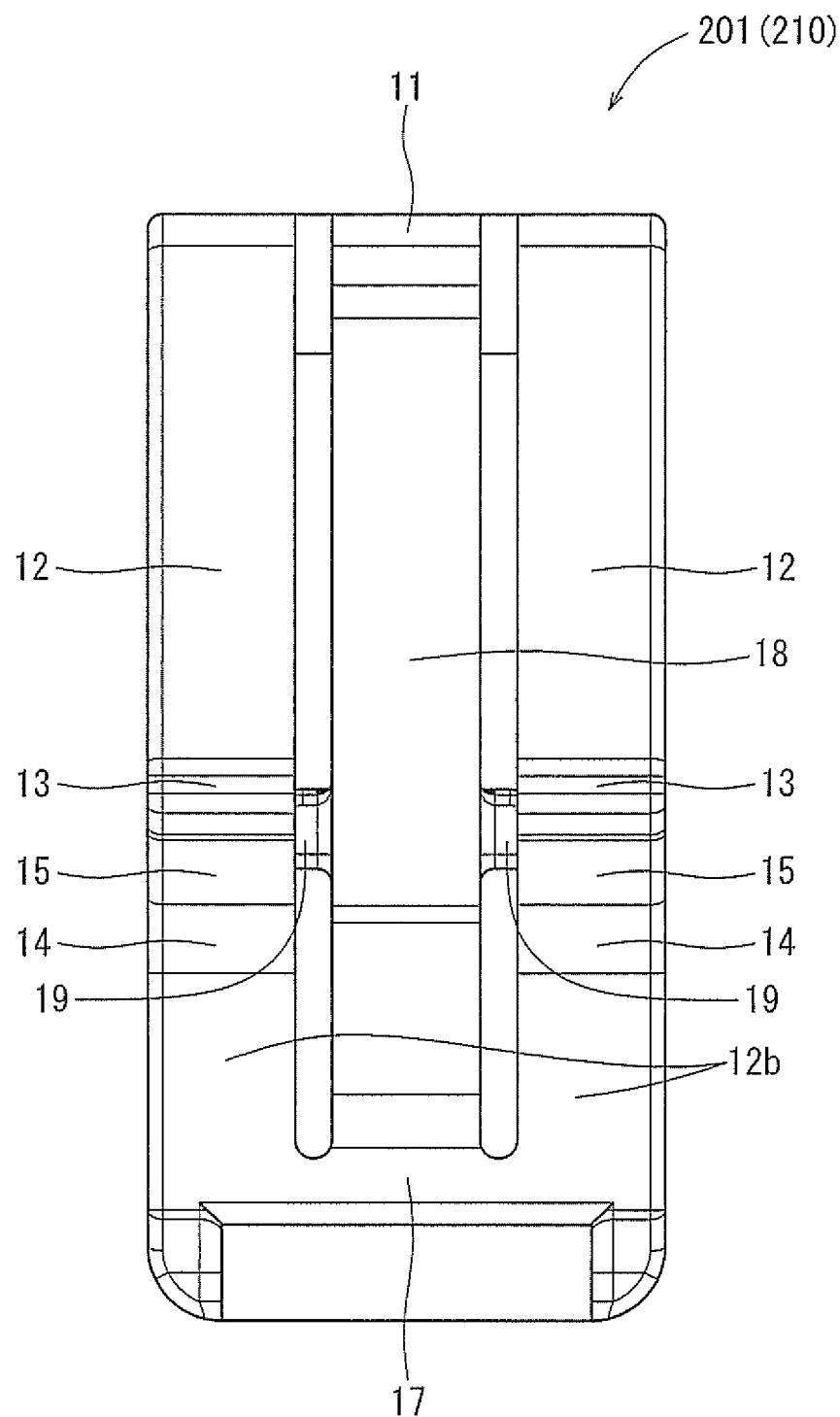
FIG. 12 is a side view of the clip.

Further, in the embodiments, each of the projections 16 formed in inner surfaces 12a of the engagement legs 12 has the semicircular shape having the rounded top surface 16a in cross section. However, as shown in FIGS. 10 to 12, in a clip 201 (a clip main body 210) of a first modified form, each of the projections 16 may have a substantially rectangular shape having a flattened top surface 16a in cross section.

Figure 13:
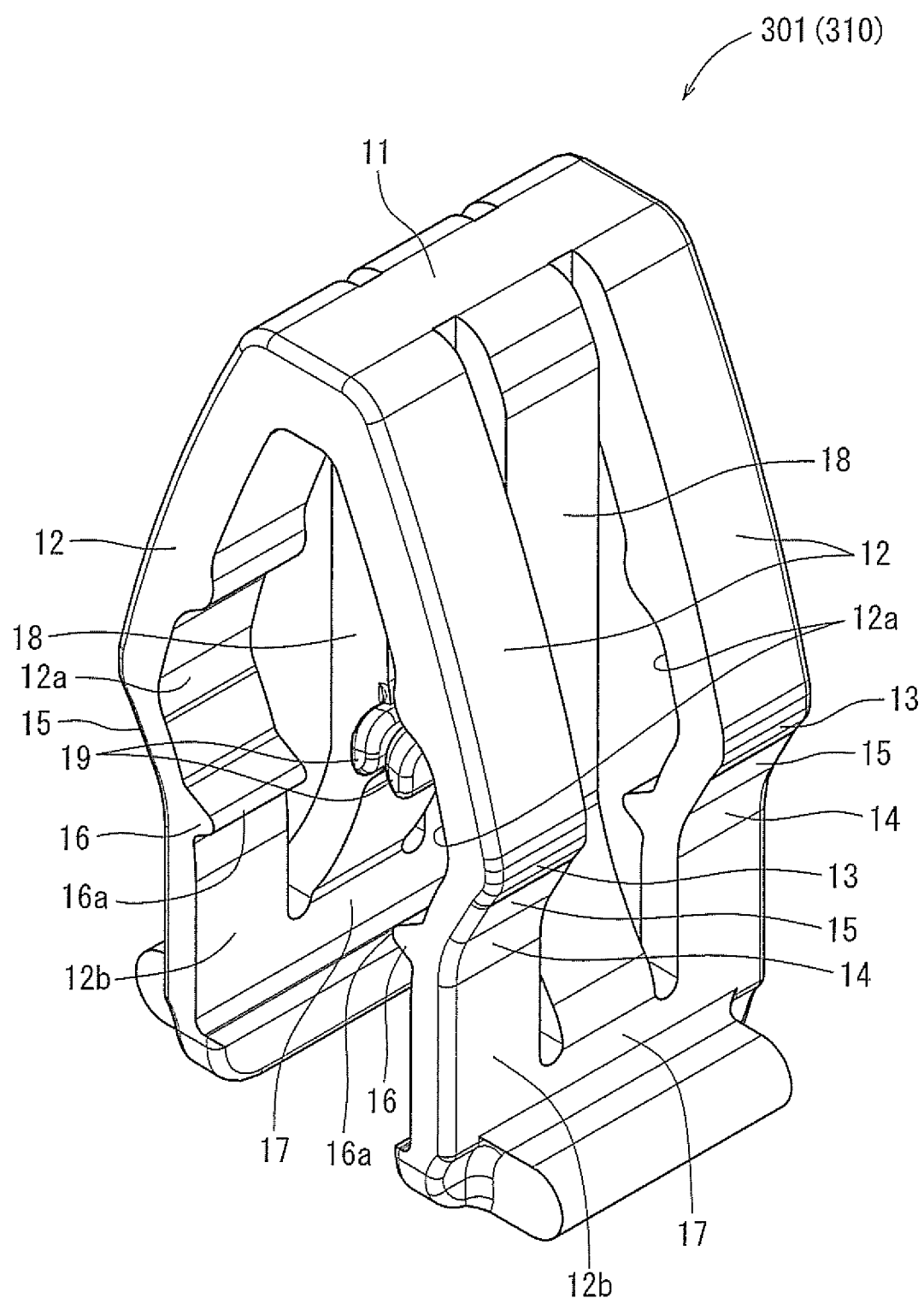
FIG. 13 is an enlarged perspective view of a clip according to a second modified form of the first embodiment.
Figure 14:
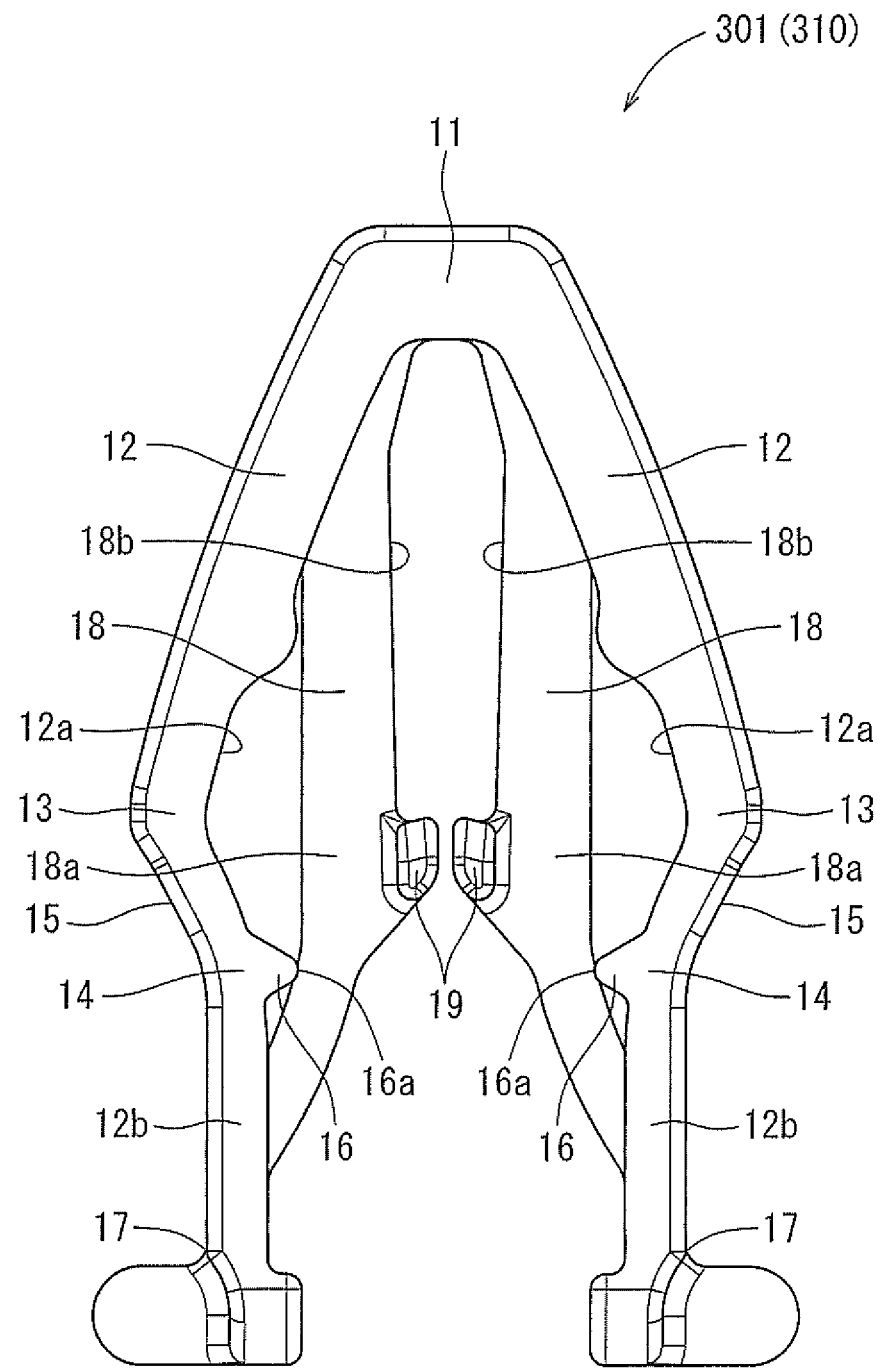
FIG. 14 is an elevational view of the clip.
Figure 15:
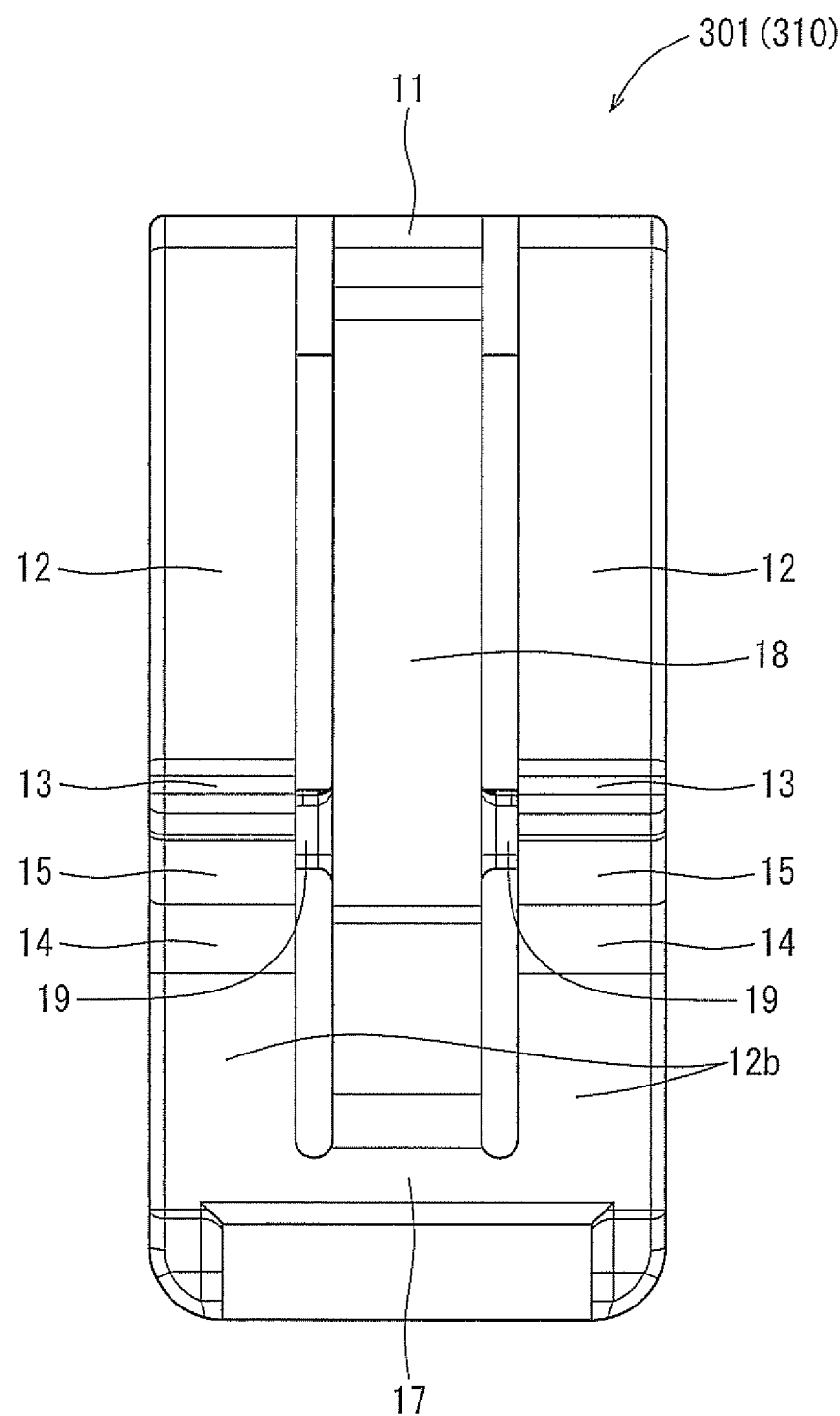
FIG. 15 is a side view of the clip.
Figure 16:
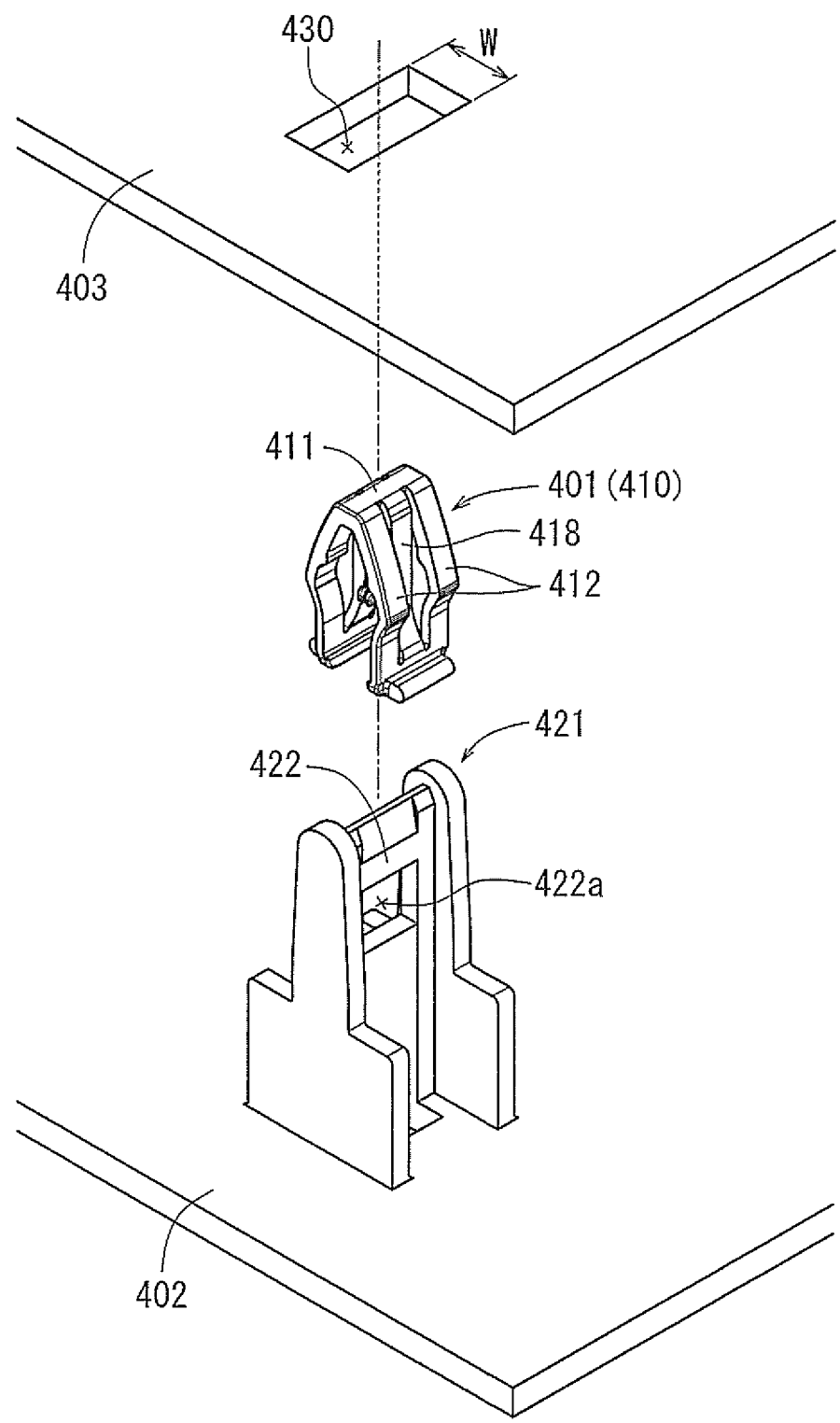
FIG. 16 is a perspective view of a first conventional clip, an interior part and an instrument panel, which illustrates a condition before the interior part is attached to the instrument panel using the clip.
Figure 17:
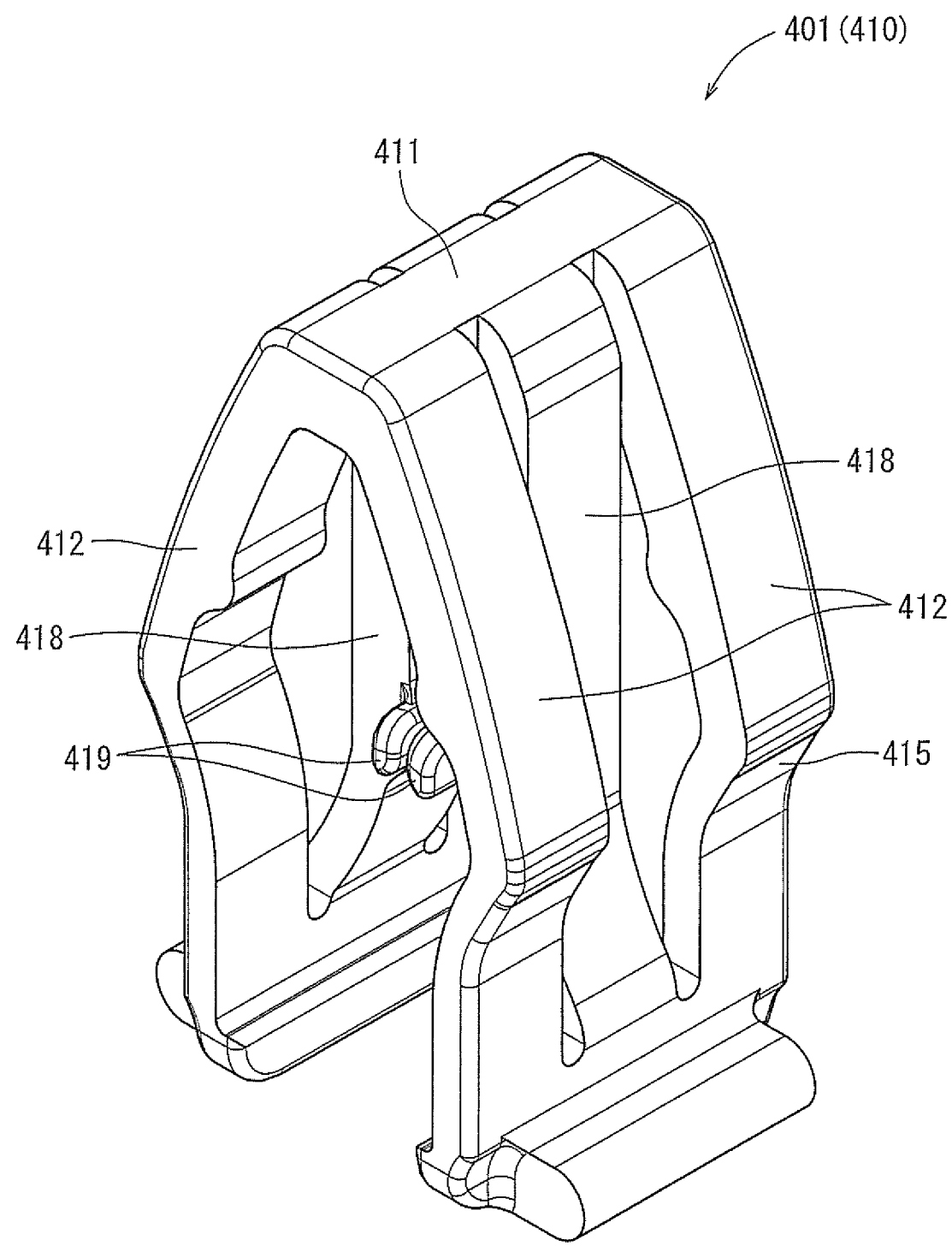
FIG. 17 is an enlarged perspective view of the clip.
Figure 18:
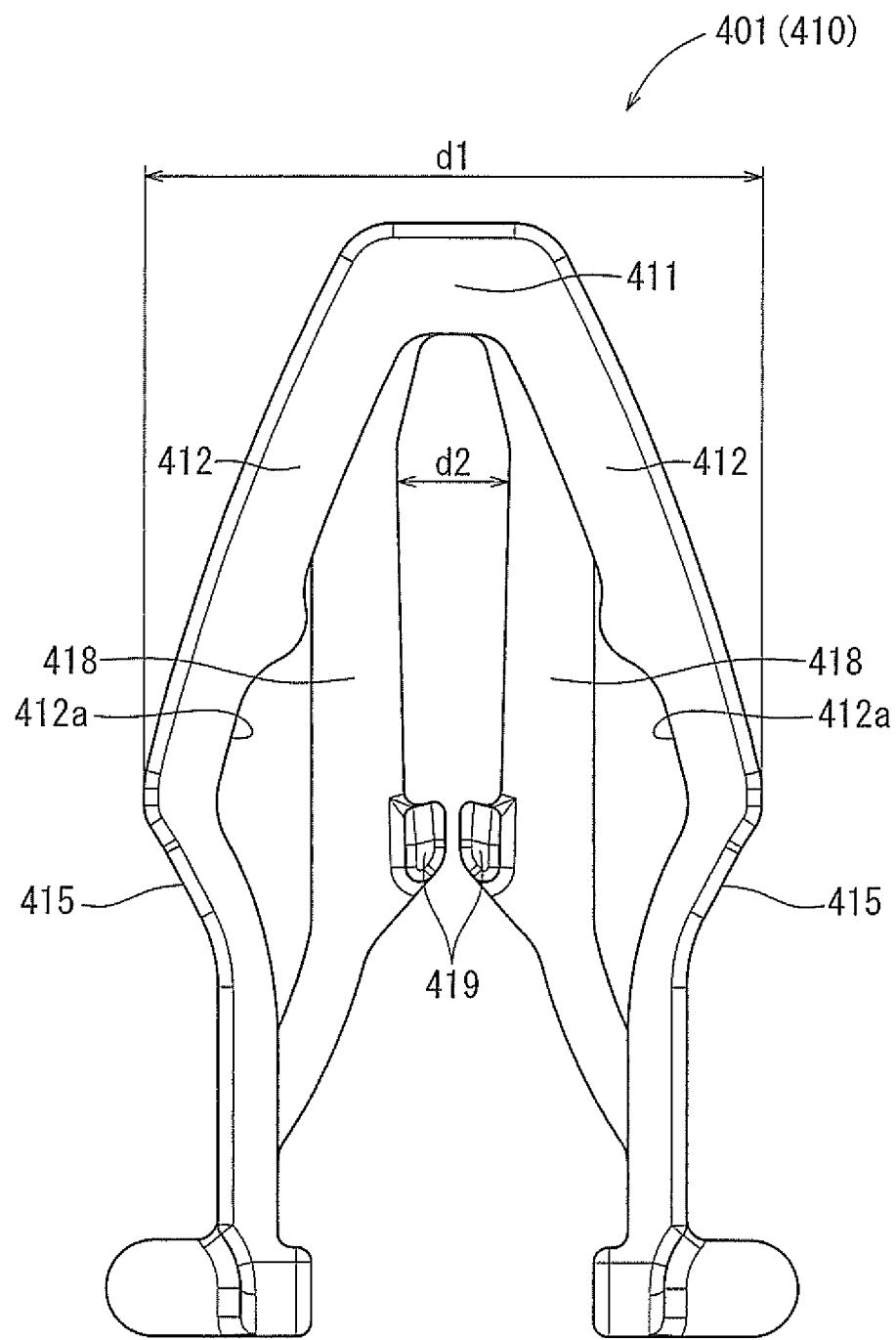
FIG. 18 is an elevational view of the clip.
Figure 19:
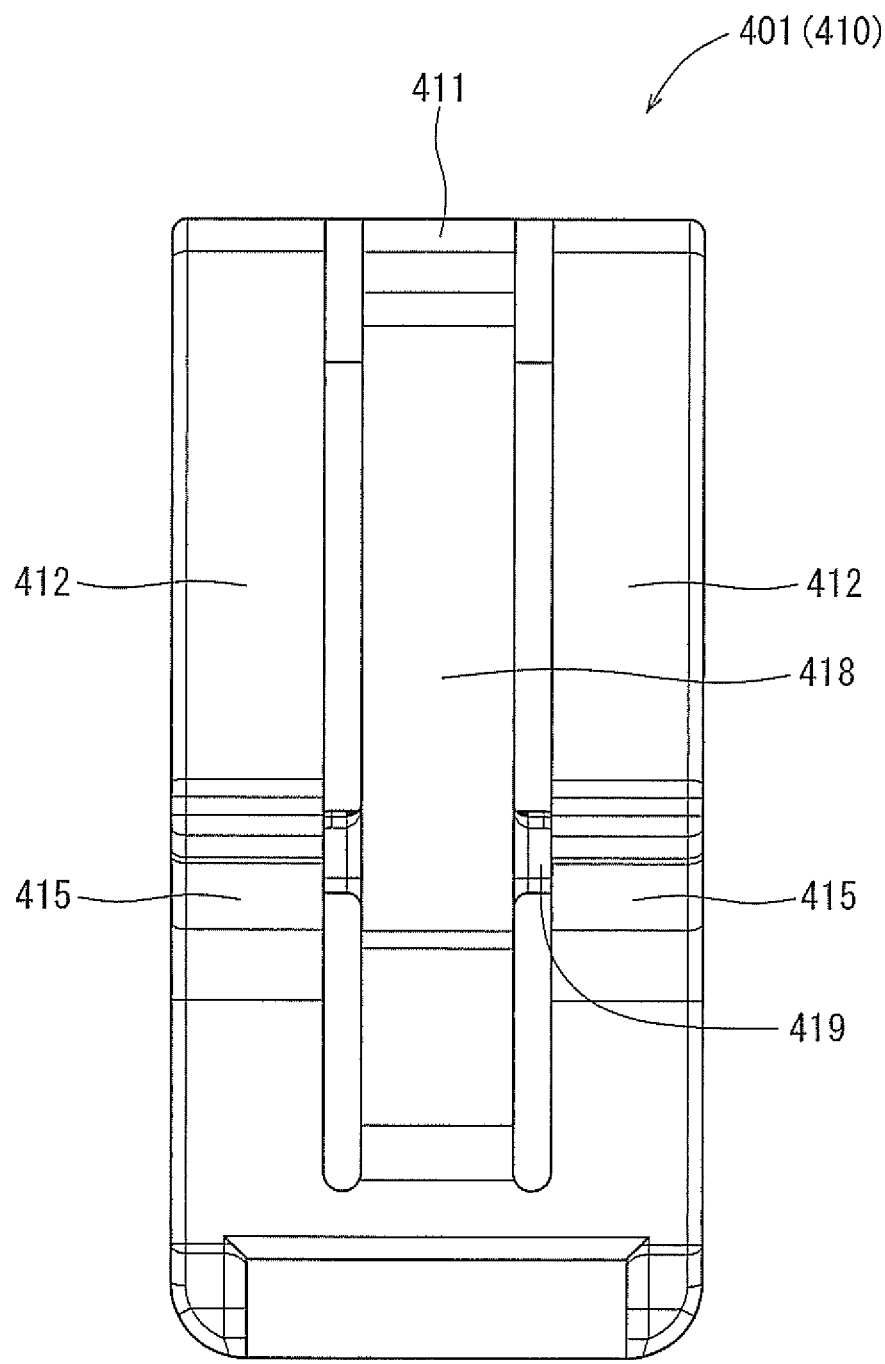
FIG. 19 is a side view of the clip.
Figure 20:
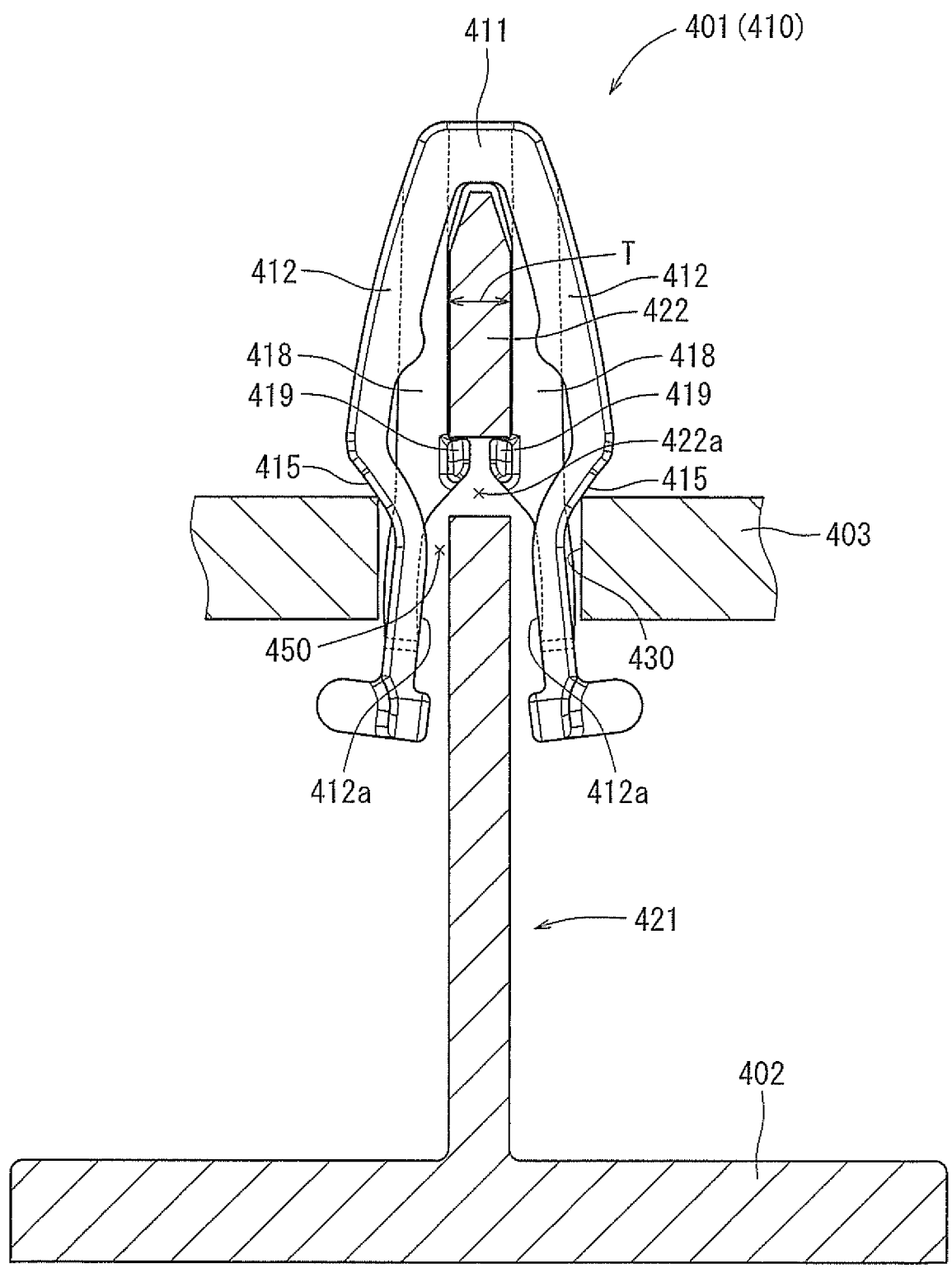
FIG. 20 is an explanatory elevational view of the clip, which illustrate a condition in which the interior part is attached to the instrument panel using the clip.
Figure 21:
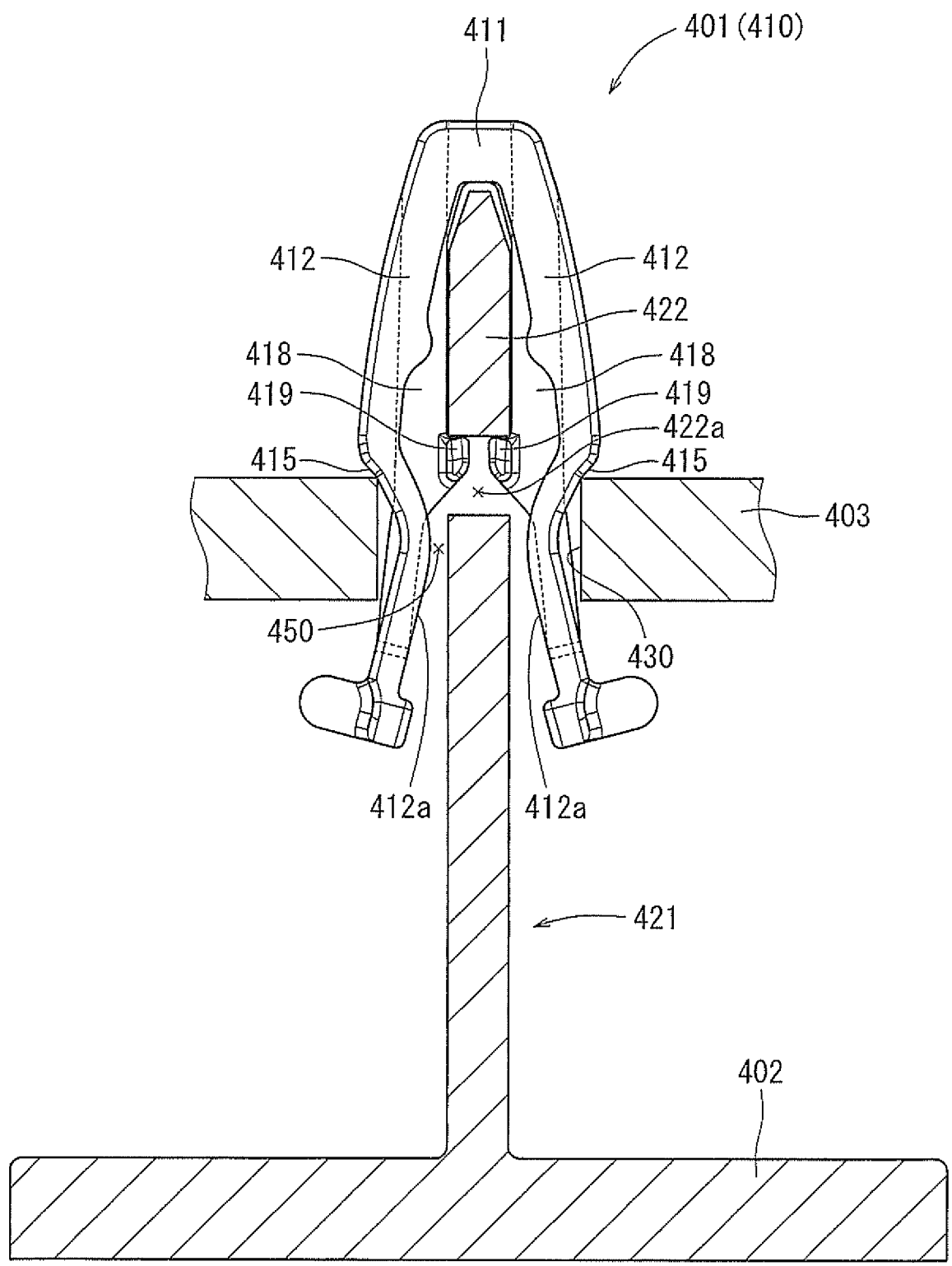
FIG. 21 is an explanatory elevational view of the clip, which illustrate a condition in which an extraction force is applied to the clip shown in FIG. 20.
Figure 22:
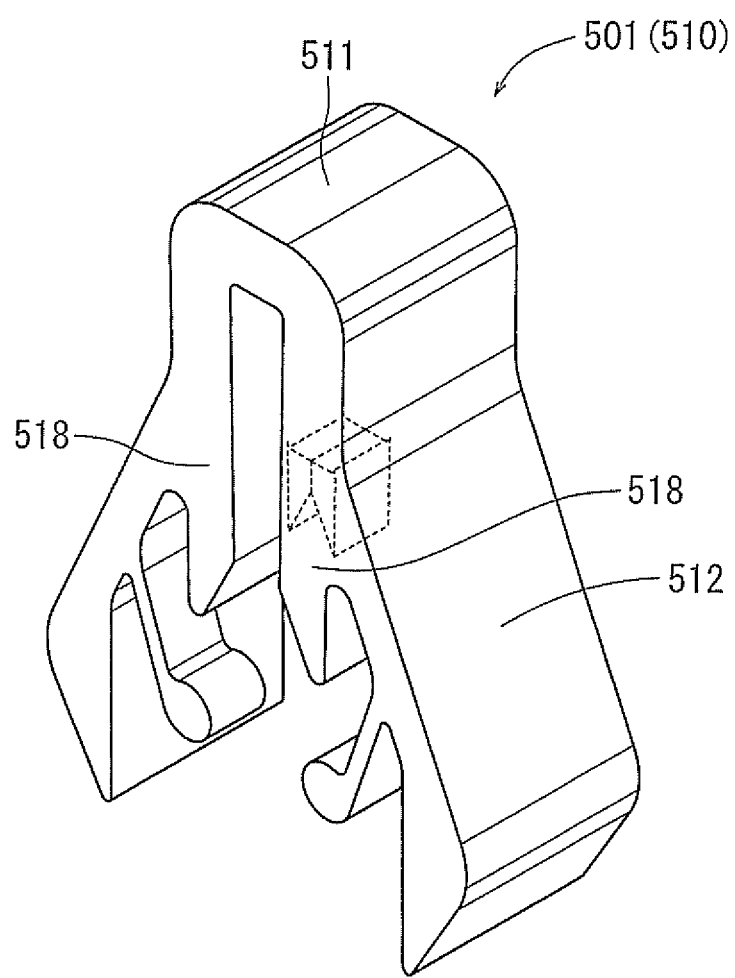
FIG. 22 is an enlarged perspective view of a second conventional clip.

Each of the projections 16 may be further modified in shape. That is, as shown in FIGS. 13 to 15, in a clip 301 (a clip main body 310) of a second modified form, each of the projections 16 may have a substantially triangular shape having a wedged top surface 16a in cross section.

Representative examples of the present disclosure have been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detail description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A clip having a clip main body that is configured to be coupled to a coupling rib of an attachment base formed in an attaching article and to be inserted into an attaching hole formed in an object member, the clip main body comprising:
 a head portion;
 a pair of engagement legs continuous with the head portion and elastically deformable inward and outward about the head portion; and
 a pair of retainer members continuous with the head portion and respectively configured to engage the coupling rib of the attachment base,
 wherein the pair of engagement legs respectively have first bent portions, second bent portions, and engagement portions positioned between the first and second bent portions and configured to engage an inner peripheral edge of the attaching hole,
 wherein the pair of engagement legs respectively have projecting space-limiting portions that are respectively fixedly formed in inner surfaces thereof along the second bent portions thereof so as to be immovable relative to the engagement legs, and
 wherein the space-limiting portions are configured to be positioned within the attaching hole in a condition in which the clip main body coupled to the coupling rib of the attachment base is inserted into the attaching hole so that the clip is held in a predetermined position in the attaching hole.

2. The clip as defined in claim 1, wherein the pair of engagement legs respectively have outwardly most-flared portions, and wherein the first bent portions are respectively positioned adjacent to the outwardly most-flared portions.

3. The clip as defined in claim 1, wherein the pair of engagement legs are respectively formed as frame shaped members respectively having terminal ends, and wherein the pair of retainer members are respectively flexibly connected to the terminal ends of the pair of engagement legs.

4. The clip as defined in claim 1, wherein the space-limiting portions are configured to minimize spaces formed between the inner surfaces of the pair of engagement legs and the coupling rib of the attachment base in a condition in which the clip main body coupled to the coupling rib of the attachment base is inserted into the attaching hole.

5. A clip for detachably attaching an attaching article to an object member by inserting a clip main body thereof coupled to a coupling rib of an attachment base formed in the attaching article into an attaching hole formed in the object member, the clip main body comprising:
 a head portion;
 a pair of engagement legs continuous with the head portion and configured to be elastically deformable; and
 a pair of retainer members respectively formed in the pair of engagement legs and respectively having engagement projections that are configured to engage the coupling rib of the attachment base,
 wherein the pair of engagement legs respectively have first bent portions, second bent portions, and engagement portions positioned between the first and second bent portions and configured to engage an inner peripheral edge of the attaching hole,
 wherein the pair of engagement legs respectively have projecting space-limiting portions that are respectively fixedly formed in inner surfaces thereof along the second bent portions so as to be immovable relative to the engagement legs,
 wherein the space-limiting portions are configured to close spaces formed between the inner surfaces of the pair of engagement legs and the coupling rib when an extraction force is applied to the clip main body inserted into the attaching hole, and
 wherein the space-limiting portions are configured to be positioned within the attaching hole in a condition in which the clip main body coupled to the coupling rib of the attachment base is inserted into the attaching hole so that the clip is held in a predetermined final position in the attaching hole.

* * * * *